United States Patent
Gutta et al.

(10) Patent No.: US 10,732,885 B2
(45) Date of Patent: *Aug. 4, 2020

(54) BLOCK-LEVEL LIVE BROWSING AND PRIVATE WRITABLE SNAPSHOTS USING AN ISCSI SERVER

(71) Applicant: Commvault Systems, Inc., Tinton Falls, NJ (US)

(72) Inventors: Sunil Kumar Gutta, Hyderabad (IN); Vijay H. Agrawal, Pune (IN)

(73) Assignee: Commvault Systems, Inc., Tinton Falls, NJ (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/981,770

(22) Filed: May 16, 2018

(65) Prior Publication Data

US 2019/0250827 A1 Aug. 15, 2019

Related U.S. Application Data

(60) Provisional application No. 62/630,698, filed on Feb. 14, 2018.

(51) Int. Cl.
| | |
|---|---|
| *G06F 3/06* | (2006.01) |
| *G06F 13/16* | (2006.01) |
| *G06F 13/42* | (2006.01) |

(52) U.S. Cl.
CPC .............. *G06F 3/065* (2013.01); *G06F 3/064* (2013.01); *G06F 3/067* (2013.01); *G06F 3/0619* (2013.01);
(Continued)

(58) Field of Classification Search
CPC ........ G06F 3/0619; G06F 3/064; G06F 3/067; G06F 13/1668; G06F 13/4221; G06F 2213/0036
See application file for complete search history.

(56) References Cited

U.S. PATENT DOCUMENTS

| | | | |
|---|---|---|---|
| 4,296,465 A | 10/1981 | Lemak | |
| 4,686,620 A | 8/1987 | Ng | |

(Continued)

FOREIGN PATENT DOCUMENTS

| | | |
|---|---|---|
| AU | 2006331932 | 12/2006 |
| CA | 2632935 | 12/2006 |

(Continued)

OTHER PUBLICATIONS

U.S. Appl. No. 15/981,712, filed May 16, 2018, Gutta et al.
(Continued)

*Primary Examiner* — Ramon A. Mercado
(74) *Attorney, Agent, or Firm* — Knobbe Martens Olson & Bear LLP

(57) ABSTRACT

An illustrative ISCSI server computing device provides user computing devices with "private writable snapshots" of a desired volume of data and/or further provides "private writable backup copies." The ISCSI service is provided without invoking snapshot limits imposed by storage arrays and further without specialized backup software and pseudo-disk drivers installed on the user computing devices. A user can browse as well as edit personal versions of any number and/or versions of block-level backup copies—the "private writable backup copies." Likewise, a user can browse and edit personal versions of any number of snapshots of one or more versions of one or more desired data volumes—the "private writable snapshots." A user can have any number of co-existing private writable snapshots and private writable backup copies. Sparse files, extent-files, software snapshots, and/or media agents co-residing on the ISCSI server are used in the illustrative embodiments.

19 Claims, 18 Drawing Sheets

(52) U.S. Cl.
CPC ...... *G06F 13/1668* (2013.01); *G06F 13/4221* (2013.01); *G06F 2213/0036* (2013.01)

(56) References Cited

U.S. PATENT DOCUMENTS

| | | | |
|---|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,819,292 A | 10/1998 | Hitz et al. |
| 5,829,046 A | 10/1998 | Tzelnic et al. |
| 5,835,953 A | 11/1998 | Ohran |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,938,135 A | 8/1999 | Sasaki et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,061,692 A | 5/2000 | Thomas et al. |
| 6,072,490 A | 6/2000 | Bates et al. |
| 6,076,148 A | 6/2000 | Kedem et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rikieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |

(56) References Cited

U.S. PATENT DOCUMENTS

| | | |
|---|---|---|
| 6,434,681 B1 | 8/2002 | Amangau |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,909 B1 | 4/2003 | Tamer et al. |
| 6,542,972 B2 | 4/2003 | Ignatius et al. |
| 6,557,089 B1 | 4/2003 | Reed et al. |
| 6,564,228 B1 | 5/2003 | O'Connor |
| 6,581,143 B2 | 6/2003 | Gagne et al. |
| 6,594,744 B1 | 7/2003 | Humlicek et al. |
| 6,604,118 B2 | 8/2003 | Kleinman et al. |
| 6,604,149 B1 | 8/2003 | Deo et al. |
| 6,606,690 B2 | 8/2003 | Padovano |
| 6,615,223 B1 | 9/2003 | Shih et al. |
| 6,631,477 B1 | 10/2003 | LeCrone et al. |
| 6,631,493 B2 | 10/2003 | Ottesen et al. |
| 6,643,671 B2 | 11/2003 | Milillo et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,721,767 B2 | 4/2004 | De Meno et al. |
| 6,728,733 B2 | 4/2004 | Tokui |
| 6,728,736 B2 | 4/2004 | Hostetter et al. |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,518 B2 | 9/2004 | Armangau et al. |
| 6,799,258 B1 | 9/2004 | Linde |
| 6,836,779 B2 | 12/2004 | Poulin |
| 6,871,163 B2 | 3/2005 | Hiller et al. |
| 6,871,271 B2 | 3/2005 | Ohran et al. |
| 6,877,016 B1 | 4/2005 | Hart et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,898,688 B2 | 5/2005 | Martin et al. |
| 6,912,482 B2 | 6/2005 | Kaiser |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,948,038 B2 | 9/2005 | Berkowitz et al. |
| 6,948,089 B2 | 9/2005 | Fujibayashi |
| 6,952,705 B2 | 10/2005 | Knoblock et al. |
| 6,952,758 B2 | 10/2005 | Chron et al. |
| 6,954,834 B2 | 10/2005 | Slater et al. |
| 6,957,362 B2 | 10/2005 | Armangau |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,032,131 B2 | 4/2006 | Lubbers et al. |
| 7,035,880 B1 | 4/2006 | Crescenti et al. |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,072,915 B2 | 7/2006 | Kaczmarski et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,096,315 B2 | 8/2006 | Takeda et al. |
| 7,100,089 B1 | 8/2006 | Phelps |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,111,026 B2 | 9/2006 | Sato |
| 7,120,757 B2 | 10/2006 | Tsuge |
| 7,130,860 B2 | 10/2006 | Pachet |
| 7,130,970 B2 | 10/2006 | Devassy et al. |
| 7,139,887 B2 | 11/2006 | Colgrove et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,165,079 B1 | 1/2007 | Chen et al. |
| 7,174,352 B2 | 2/2007 | Kleinman et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,197,665 B2 | 3/2007 | Goldstein et al. |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,246,140 B2 | 7/2007 | Therrien et al. |
| 7,246,207 B2 | 7/2007 | Kottomtharayil et al. |
| 7,251,713 B1 | 7/2007 | Zhang |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Amangau et al. |
| 7,275,277 B2 | 10/2007 | Moskovich et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,330,997 B1* | 2/2008 | Odom .................. G06F 11/1464 |
| | | 711/162 |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,370,232 B2 | 5/2008 | Safford |
| 7,373,364 B1 | 5/2008 | Chapman |
| 7,380,072 B2 | 5/2008 | Kottomtharayil et al. |
| 7,383,538 B2 | 6/2008 | Bates et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,395,387 B2 | 7/2008 | Berkowitz et al. |
| 7,409,509 B2 | 8/2008 | Devassy et al. |
| 7,412,583 B2 | 8/2008 | Burton et al. |
| 7,415,488 B1 | 8/2008 | Muth et al. |
| 7,421,554 B2 | 9/2008 | Colgrove et al. |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,457,982 B2* | 11/2008 | Rajan .................. G06F 16/10 |
| | | 714/15 |

(56) References Cited

U.S. PATENT DOCUMENTS

| | | |
|---|---|---|
| 7,467,167 B2 | 12/2008 | Patterson |
| 7,467,267 B1 | 12/2008 | Mayock |
| 7,472,238 B1 | 12/2008 | Gokhale |
| 7,484,054 B2 | 1/2009 | Kottomtharayil et al. |
| 7,490,207 B2 | 2/2009 | Amarendran et al. |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyll et al. |
| 7,523,276 B1 | 4/2009 | Shankar |
| 7,523,483 B2 | 4/2009 | Dogan |
| 7,529,748 B2 | 5/2009 | Wen et al. |
| 7,529,782 B2 | 5/2009 | Prahlad et al. |
| 7,529,898 B2 | 5/2009 | Nguyen et al. |
| 7,532,340 B2 | 5/2009 | Koppich et al. |
| 7,536,291 B1 | 5/2009 | Vijayan Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,565,572 B2 | 7/2009 | Yamasaki |
| 7,567,991 B2 | 7/2009 | Armangau et al. |
| 7,568,080 B2 | 7/2009 | Prahlad et al. |
| 7,577,806 B2 | 8/2009 | Rowan |
| 7,581,077 B2 | 8/2009 | Ignatius et al. |
| 7,587,563 B1 | 9/2009 | Teterin et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,606,868 B1 | 10/2009 | Le et al. |
| 7,610,387 B1 | 10/2009 | Liskov et al. |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,620,666 B1 | 11/2009 | Root et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,664,771 B2 | 2/2010 | Kusters et al. |
| 7,668,798 B2 | 2/2010 | Scanlon et al. |
| 7,669,029 B1 | 2/2010 | Mishra et al. |
| 7,672,979 B1 | 3/2010 | Appellof et al. |
| 7,685,126 B2 | 3/2010 | Patel et al. |
| 7,689,467 B1 | 3/2010 | Belanger et al. |
| 7,702,533 B2 | 4/2010 | Barnard et al. |
| 7,707,184 B1 | 4/2010 | Zhang et al. |
| 7,716,171 B2 | 5/2010 | Kryger |
| 7,734,578 B2 | 6/2010 | Prahlad et al. |
| 7,734,669 B2 | 6/2010 | Kottomtharayil et al. |
| 7,734,715 B2 | 6/2010 | Hyakutake et al. |
| 7,739,235 B2 | 6/2010 | Rousseau et al. |
| 7,747,579 B2 | 6/2010 | Prahlad et al. |
| 7,747,660 B1* | 6/2010 | Rajan ............... G06F 3/0608 707/821 |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,844,577 B2 | 11/2010 | Becker et al. |
| 7,870,355 B2 | 1/2011 | Erofeev |
| 7,870,356 B1* | 1/2011 | Veeraswamy ......... G06F 3/0607 711/162 |
| 7,930,274 B2 | 4/2011 | Hwang et al. |
| 7,930,476 B1 | 4/2011 | Castelli et al. |
| 7,962,455 B2 | 6/2011 | Erofeev |
| 7,962,709 B2 | 6/2011 | Agrawal |
| 8,024,292 B2 | 9/2011 | Thompson et al. |
| 8,024,294 B2 | 9/2011 | Kottomtharayil |
| 8,046,334 B2 | 10/2011 | Hwang et al. |
| 8,060,695 B1 | 11/2011 | Lee et al. |
| 8,121,983 B2 | 2/2012 | Prahlad et al. |
| 8,156,086 B2 | 4/2012 | Lu et al. |
| 8,166,263 B2 | 4/2012 | Prahlad |
| 8,170,995 B2 | 5/2012 | Prahlad et al. |
| 8,190,565 B2 | 5/2012 | Prahlad et al. |
| 8,204,859 B2 | 6/2012 | Ngo |
| 8,205,049 B1 | 6/2012 | Armangau et al. |
| 8,219,524 B2 | 7/2012 | Gokhale |
| 8,229,954 B2 | 7/2012 | Kottomtharayil et al. |
| 8,230,195 B2 | 7/2012 | Amarendran et al. |
| 8,245,128 B1 | 8/2012 | Ahad et al. |
| 8,271,830 B2 | 9/2012 | Erofeev |
| 8,285,681 B2 | 10/2012 | Prahlad et al. |
| 8,307,177 B2 | 11/2012 | Prahlad et al. |
| 8,326,803 B1 | 12/2012 | Stringham |
| 8,346,727 B1 | 1/2013 | Chester et al. |
| 8,352,422 B2 | 1/2013 | Prahlad et al. |
| 8,356,013 B2 | 1/2013 | Fachan et al. |
| 8,364,652 B2 | 1/2013 | Vijayan et al. |
| 8,463,751 B2 | 6/2013 | Kottomtharayil |
| 8,489,656 B2 | 7/2013 | Erofeev |
| 8,490,088 B2* | 7/2013 | Tang .................. G06F 9/4856 718/1 |
| 8,510,271 B1 | 8/2013 | Tsaur et al. |
| 8,521,694 B1 | 8/2013 | Natanzon |
| 8,578,120 B2 | 11/2013 | Attarde et al. |
| 8,645,320 B2 | 2/2014 | Prahlad et al. |
| 8,656,123 B2 | 2/2014 | Lee |
| 8,719,226 B1 | 5/2014 | Jiang et al. |
| 8,725,694 B2 | 5/2014 | Kottomtharayil |
| 8,789,208 B1 | 7/2014 | Sundaram et al. |
| 8,856,079 B1 | 10/2014 | Subramanian et al. |
| 8,868,494 B2 | 10/2014 | Agrawal |
| 8,886,595 B2 | 11/2014 | Prahlad et al. |
| 8,930,497 B1 | 1/2015 | Holmes et al. |
| 8,954,446 B2 | 2/2015 | Vijayan et al. |
| 9,002,785 B2 | 4/2015 | Prahlad et al. |
| 9,015,121 B1 | 4/2015 | Salamon et al. |
| 9,020,900 B2 | 4/2015 | Vijayan et al. |
| 9,098,495 B2 | 8/2015 | Gokhale |
| 9,128,901 B1 | 9/2015 | Nickurak et al. |
| 9,208,160 B2 | 12/2015 | Prahlad et al. |
| 9,218,252 B1 | 12/2015 | Revur et al. |
| 9,239,687 B2 | 1/2016 | Vijayan et al. |
| 9,239,840 B1 | 1/2016 | Acharya |
| 9,251,198 B2 | 2/2016 | Mutalik et al. |
| 9,298,715 B2 | 3/2016 | Kumarasamy et al. |
| 9,342,537 B2 | 5/2016 | Kumarasamy et al. |
| 9,405,631 B2 | 8/2016 | Prahlad et al. |
| 9,448,731 B2 | 9/2016 | Nallathambi et al. |
| 9,471,578 B2 | 10/2016 | Nallathambi et al. |
| 9,495,251 B2 | 11/2016 | Kottomtharayil et al. |
| 9,535,907 B1 | 1/2017 | String Ham |
| 9,619,172 B1 | 4/2017 | Natanzon et al. |
| 9,619,341 B2 | 4/2017 | Prahlad et al. |
| 9,632,874 B2 | 4/2017 | Pawar et al. |
| 9,639,426 B2 | 5/2017 | Pawar et al. |
| 9,648,105 B2 | 5/2017 | Nallathambi et al. |
| 9,753,812 B2 | 9/2017 | Pawar et al. |
| 9,774,672 B2 | 9/2017 | Nallathambi et al. |
| 9,852,026 B2 | 12/2017 | Mitkar et al. |
| 9,886,346 B2 | 2/2018 | Kumarasamy et al. |
| 9,892,123 B2 | 2/2018 | Kottomtharayil et al. |
| 9,898,371 B2 | 2/2018 | Kumarasamy et al. |
| 9,921,920 B2 | 3/2018 | Nallathambi et al. |
| 9,928,002 B2 | 3/2018 | Kumarasamy et al. |
| 9,928,146 B2 | 3/2018 | Nallathambi et al. |
| 9,965,306 B1 | 5/2018 | Natanzon et al. |
| 9,996,428 B2 | 6/2018 | Nallathambi et al. |
| 10,042,716 B2 | 8/2018 | Nallathambi et al. |
| 10,044,803 B2 | 8/2018 | Nallathambi et al. |
| 10,223,365 B2 | 3/2019 | Kottomtharayil et al. |
| 10,228,962 B2 | 3/2019 | Dornemann et al. |
| 10,250,679 B1 | 4/2019 | Natanzon et al. |
| 10,419,536 B2 | 9/2019 | Nallathambi et al. |
| 10,503,753 B2 | 12/2019 | Mitkar et al. |

(56) References Cited

U.S. PATENT DOCUMENTS

| | | |
|---|---|---|
| 10,521,308 B2 | 12/2019 | Nallathambi et al. |
| 2001/0027457 A1 | 10/2001 | Yee |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0042222 A1 | 11/2001 | Kedem et al. |
| 2001/0044807 A1 | 11/2001 | Kleiman et al. |
| 2001/0044834 A1 | 11/2001 | Bradshaw et al. |
| 2002/0002557 A1 | 1/2002 | Straube et al. |
| 2002/0004883 A1 | 1/2002 | Nguyen et al. |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0069324 A1 | 6/2002 | Gerasimov et al. |
| 2002/0073070 A1 | 6/2002 | Morita et al. |
| 2002/0083055 A1 | 6/2002 | Pachet et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0133511 A1 | 9/2002 | Hostetter |
| 2002/0133512 A1 | 9/2002 | Milillo et al. |
| 2002/0143903 A1 | 10/2002 | Uratani et al. |
| 2002/0152381 A1 | 10/2002 | Kuriya et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2003/0018657 A1 | 1/2003 | Monday |
| 2003/0028736 A1 | 2/2003 | Berkowitz et al. |
| 2003/0061491 A1 | 3/2003 | Jaskiewicz et al. |
| 2003/0097296 A1 | 5/2003 | Putt |
| 2003/0131278 A1 | 7/2003 | Fujibayashi |
| 2003/0135783 A1 | 7/2003 | Martin et al. |
| 2003/0140070 A1 | 7/2003 | Kaczmarski et al. |
| 2003/0158834 A1 | 8/2003 | Sawdon et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0002934 A1 | 1/2004 | Taulbee et al. |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0098425 A1 | 5/2004 | Wiss et al. |
| 2004/0107199 A1 | 6/2004 | Dalrymple, III et al. |
| 2004/0117572 A1 | 6/2004 | Welsh et al. |
| 2004/0139128 A1 | 7/2004 | Becker et al. |
| 2004/0143642 A1 | 7/2004 | Beckmann et al. |
| 2004/0148376 A1 | 7/2004 | Rangan et al. |
| 2004/0167972 A1 | 8/2004 | Demmon |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267835 A1 | 12/2004 | Zwilling et al. |
| 2004/0267836 A1 | 12/2004 | Amangau et al. |
| 2005/0005070 A1 | 1/2005 | Lam |
| 2005/0027748 A1 | 2/2005 | Kisley |
| 2005/0027892 A1 | 2/2005 | McCabe et al. |
| 2005/0033800 A1 | 2/2005 | Kavuri et al. |
| 2005/0033878 A1 | 2/2005 | Pangal et al. |
| 2005/0060598 A1 | 3/2005 | Klotz et al. |
| 2005/0066118 A1 | 3/2005 | Perry et al. |
| 2005/0066222 A1 | 3/2005 | Rowan et al. |
| 2005/0066225 A1 | 3/2005 | Rowan et al. |
| 2005/0080928 A1 | 4/2005 | Beverly et al. |
| 2005/0086241 A1 | 4/2005 | Ram et al. |
| 2005/0108292 A1 | 5/2005 | Burton et al. |
| 2005/0138306 A1 | 6/2005 | Panchbudhe et al. |
| 2005/0144202 A1 | 6/2005 | Chen |
| 2005/0187982 A1 | 8/2005 | Sato |
| 2005/0187992 A1 | 8/2005 | Prahlad et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0246376 A1 | 11/2005 | Lu et al. |
| 2005/0246397 A1* | 11/2005 | Edwards .................. G06F 16/10 |
| 2005/0246510 A1 | 11/2005 | Retnamma et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0020616 A1 | 1/2006 | Hardy et al. |
| 2006/0034454 A1 | 2/2006 | Damgaard et al. |
| 2006/0047805 A1 | 3/2006 | Byrd et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0136771 A1 | 6/2006 | Watanabe |
| 2006/0179261 A1* | 8/2006 | Rajan ...................... G06F 16/10 |
| | | 711/162 |
| 2006/0224846 A1 | 10/2006 | Amarendran et al. |
| 2006/0242371 A1 | 10/2006 | Shono et al. |
| 2006/0242489 A1 | 10/2006 | Brockway et al. |
| 2007/0005915 A1 | 1/2007 | Thompson et al. |
| 2007/0006018 A1 | 1/2007 | Thompson et al. |
| 2007/0043956 A1 | 2/2007 | El Far et al. |
| 2007/0067263 A1 | 3/2007 | Husain et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0115738 A1 | 5/2007 | Emaru |
| 2007/0124347 A1 | 5/2007 | Vivian et al. |
| 2007/0124348 A1 | 5/2007 | Claborn et al. |
| 2007/0143371 A1 | 6/2007 | Kottomtharayil |
| 2007/0143756 A1 | 6/2007 | Gokhale |
| 2007/0174569 A1 | 7/2007 | Schnapp et al. |
| 2007/0179990 A1 | 8/2007 | Zimran et al. |
| 2007/0183224 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahlad et al. |
| 2007/0185940 A1 | 8/2007 | Prahlad et al. |
| 2007/0186068 A1 | 8/2007 | Agrawal |
| 2007/0198602 A1 | 8/2007 | Ngo et al. |
| 2007/0226438 A1 | 9/2007 | Erofeev |
| 2007/0244571 A1 | 10/2007 | Wilson et al. |
| 2007/0283111 A1 | 12/2007 | Berkowitz et al. |
| 2007/0288536 A1 | 12/2007 | Sen et al. |
| 2007/0288711 A1 | 12/2007 | Chen et al. |
| 2008/0016293 A1 | 1/2008 | Saika |
| 2008/0028009 A1 | 1/2008 | Ngo |
| 2008/0059515 A1 | 3/2008 | Fulton |
| 2008/0103916 A1 | 5/2008 | Camarador et al. |
| 2008/0183775 A1 | 7/2008 | Prahlad et al. |
| 2008/0209146 A1 | 8/2008 | Imazu et al. |
| 2008/0229037 A1 | 9/2008 | Bunte et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0244205 A1 | 10/2008 | Amano et al. |
| 2008/0306954 A1 | 12/2008 | Hornqvist |
| 2009/0044046 A1 | 2/2009 | Yamasaki |
| 2009/0070330 A1 | 3/2009 | Hwang et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0216816 A1 | 8/2009 | Basler et al. |
| 2009/0319534 A1 | 12/2009 | Gokhale |
| 2009/0319582 A1 | 12/2009 | Simek et al. |
| 2009/0319585 A1 | 12/2009 | Gokhale |
| 2010/0005259 A1 | 1/2010 | Prahlad |
| 2010/0011178 A1 | 1/2010 | Feathergill et al. |
| 2010/0036931 A1 | 2/2010 | Certain et al. |

(56) References Cited

U.S. PATENT DOCUMENTS

| | | |
|---|---|---|
| 2010/0049753 A1 | 2/2010 | Prahlad et al. |
| 2010/0070726 A1 | 3/2010 | Ngo et al. |
| 2010/0094808 A1 | 4/2010 | Erofeev |
| 2010/0100529 A1 | 4/2010 | Erofeev |
| 2010/0122053 A1 | 5/2010 | Prahlad et al. |
| 2010/0131461 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0228919 A1 | 9/2010 | Stabrawa et al. |
| 2010/0250735 A1 | 9/2010 | Andersen |
| 2010/0257142 A1 | 10/2010 | Murphy et al. |
| 2010/0287141 A1 | 11/2010 | Prahlad et al. |
| 2010/0332990 A1 | 12/2010 | Prahlad et al. |
| 2011/0047195 A1 | 2/2011 | Le et al. |
| 2011/0047340 A1 | 2/2011 | Olson et al. |
| 2011/0066599 A1 | 3/2011 | Prahlad et al. |
| 2011/0161299 A1 | 6/2011 | Prahlad et al. |
| 2011/0161300 A1 | 6/2011 | Hwang et al. |
| 2011/0196957 A1 | 8/2011 | Ayachitula et al. |
| 2011/0246416 A1 | 10/2011 | Prahlad et al. |
| 2011/0246429 A1 | 10/2011 | Prahlad et al. |
| 2011/0276594 A1 | 11/2011 | Chong et al. |
| 2011/0295804 A1 | 12/2011 | Erofeev |
| 2011/0295806 A1 | 12/2011 | Erofeev |
| 2012/0079221 A1 | 3/2012 | Sivasubramanian et al. |
| 2012/0084523 A1 | 4/2012 | Littlefield et al. |
| 2012/0124012 A1 | 5/2012 | Provenzano et al. |
| 2012/0131684 A1 | 5/2012 | Lynch |
| 2012/0150818 A1 | 6/2012 | Vijayan Retnamma et al. |
| 2012/0150826 A1 | 6/2012 | Vijayan Retnamma et al. |
| 2012/0179886 A1 | 7/2012 | Prahlad et al. |
| 2012/0317074 A1 | 12/2012 | Ngo |
| 2013/0006926 A1 | 1/2013 | Erofeev |
| 2013/0006938 A1 | 1/2013 | Prahlad et al. |
| 2013/0007183 A1 | 1/2013 | Sorenson et al. |
| 2013/0054910 A1 | 2/2013 | Vaghani et al. |
| 2013/0103650 A1 | 4/2013 | Natanzon et al. |
| 2013/0144881 A1 | 6/2013 | Sitsky et al. |
| 2013/0198311 A1 | 8/2013 | Tamir et al. |
| 2013/0218840 A1 | 8/2013 | Smith et al. |
| 2013/0262800 A1 | 10/2013 | Goodman et al. |
| 2013/0282953 A1 | 10/2013 | Orme et al. |
| 2014/0201170 A1 | 7/2014 | Vijayan et al. |
| 2014/0281317 A1 | 9/2014 | Garman et al. |
| 2015/0067231 A1* | 3/2015 | Sundarrajan ............ G06F 3/065 711/103 |
| 2015/0212894 A1 | 7/2015 | Pawar et al. |
| 2016/0350391 A1 | 12/2016 | Vijayan et al. |
| 2017/0168903 A1 | 6/2017 | Dornemann et al. |
| 2017/0185488 A1 | 6/2017 | Kumarasamy et al. |
| 2017/0192860 A1 | 7/2017 | Vijayan et al. |
| 2017/0192861 A1 | 7/2017 | Vijayan et al. |
| 2017/0192866 A1 | 7/2017 | Vijayan et al. |
| 2017/0192867 A1 | 7/2017 | Vijayan et al. |
| 2017/0192868 A1 | 7/2017 | Vijayan et al. |
| 2017/0193003 A1 | 7/2017 | Pawar et al. |
| 2017/0206142 A1 | 7/2017 | Pawar et al. |
| 2017/0235647 A1 | 8/2017 | Kilaru et al. |
| 2017/0242871 A1 | 8/2017 | Kilaru et al. |
| 2018/0157559 A1 | 6/2018 | Nallathambi et al. |
| 2018/0196821 A1 | 7/2018 | Kottomtharayil et al. |
| 2018/0232278 A1 | 8/2018 | Kumarasamy et al. |
| 2018/0275880 A1 | 9/2018 | Kumarasamy et al. |
| 2018/0314605 A1 | 11/2018 | Nallathambi et al. |
| 2018/0324248 A1 | 11/2018 | Nallathambi et al. |
| 2018/0373602 A1 | 12/2018 | Nallathambi et al. |
| 2019/0146948 A1 | 5/2019 | Kottomtharayil et al. |
| 2019/0250827 A1* | 8/2019 | Gutta .................... G06F 3/0619 |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 2000-347811 | 12/2000 |
| WO | WO 1993/003549 | 2/1993 |
| WO | WO 1995/013580 | 5/1995 |
| WO | WO 1998/39707 | 9/1998 |
| WO | WO 1999/012098 | 3/1999 |
| WO | WO 1999/014692 | 3/1999 |
| WO | WO 2002/095632 | 11/2002 |
| WO | WO 2003/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |

OTHER PUBLICATIONS

Armstead et al., "Implementation of a Campus-Wide Distributed Mass Storage Service: The Dream vs. Reality," IEEE, 1995, pp. 190-199.

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, 9 pages, San Francisco, CA.

"Easy snapshot backup and recovery is here." Copyright date listed 2014. 6 pages.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Gray (#1 of 2, pp. 646-655), Jim; Reuter, Andreas, Transaction Processing: Concepts and Techniques, Morgan Kaufmann Publisher, USA 1994, 1994,11 pages.

Gray (#2 of 2, pp. 604-609), Jim; Reuter Andreas, Transaction Processing Concepts and Techniques, Morgan Kaufmann Publisher, USA 1994, pp. 604-609.

Harrington, Lisa H., "The RFP Process: How to Hire a Third Party", Transportation & Distribution, Sep. 1988, vol. 39, Issue 9, in 5 pages.

http://en.wikipedia.org/wiki/Naive_Bayes_classifier, printed on Jun. 1, 2010, in 7 pages.

IntelliSnap—Advanced Snapshots—NAS iDataAgent. <http://documentation.commvault.com/commvault/v10/article?p=products/nas ndmp/snap . . . > Retrieved Oct. 24, 2014. 14 pages.

Dander, "Launching Storage-Area Net," Data Communications, US, McGraw Hill, NY, vol. 27, No. 4(Mar. 21, 1998), pp. 64-72.

(56) References Cited

OTHER PUBLICATIONS

Kashyap, et al., "Professional Services Automation: A knowledge Management approach using LSI and Domain specific Ontologies", FLAIRS-01 Proceedings, 2001, pp. 300-302.
Li et al., "iROW: An Efficient Live Snapshot System for Virtual Machine Disk", ICPADS 2012, Singapore, Dec. 17-19, 2012, pp. 376-383.
Lyon J., Design considerations in replicated database systems for disaster protection, Compcon 1988, Feb. 29, 1988, pp. 428-430.
Microsoft Corporation, "Microsoft Exchange Server: Best Practices for Exchange Database Management," 1998, 26 pages.
Microsoft, "How Volume Shadow Copy Service Works", date listed Mar. 28, 2003.
Oltean, "VSS writers and inconsistent shadow copies", date listed Sep. 1, 2005, http://blogs.msdn.com/b/adioltean/archive/2005/08/31/458907.aspx., 2 pages.
Rosenblum et al., "The Design and Implementation of a Log-Structure File System," Operating Systems Review SIGOPS, vol. 25, No. 5, New York, US, pp. 1-14 (May 1991).
Simpana Intellisnap Snapshot Management Technology: Exponentially Accelerate Data Protection and Recovery. Copyright date listed 1999-2013. 2 pages.
Simpana Intellisnap Technology—Making Snaps Work. Copyright date listed 2014. 2 pages.
The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009, 58 pages.
Veritas Software Corporation, "Veritas Volume Manager 3.2, Administrator's Guide," Aug. 2001, 360 pages.
Waldspurger, Carl, et al., I/O Virtualization, Communications of the ACM, vol. 55, No. 1, Jan. 2012, pp. 66-72.
Wiesmann M, Database replication techniques: a three parameter classification, Oct. 16, 2000, pp. 206-215.
Examiner's Report for Australian Application No. 2003279847, dated Dec. 9, 2008, 4 pages.
European Examination Report; Application No. 06848901.2, dated Apr. 1, 2009, pp. 7.
Second Examination Report in EU Appl. No. 06 848 901.2-2201 dated Dec. 3, 2010.
Examiner's First Report; Application No. 2006331932 dated May 11, 2011 in 2 pages.
Canadian Office Action dated Dec. 10, 2009, Application No. CA2544063, 3 pages.
Canadian Office Action dated Dec. 29, 2010, Application No. CA2546304, 4 pages.
First Office Action in Indian Application No. 3359/DELNP/2006 dated Feb. 11, 2013, 2 pages.
Final Office Action for Japanese Application No. 2003531581, dated Mar. 24, 2009, 6 pages.
First Office Action for Japanese Application No. 2003531581, dated Jul. 8, 2008, 8 pages.
International Preliminary Report on Patentability, PCT Application No. PCT/US2009/066880, dated Jun. 23, 2011, in 9 pages.
International Search Report and Written Opinion dated Nov. 13, 2009, PCT/US2007/081681m, 8 pages.
International Search Report and Written Opinion issued in PCT Application No. PCT/US2011/030396, dated Jul. 18, 2011, in 20 pages.
International Search Report and Written Opinion issued in PCT Application No. PCT/US2011/38436, dated Sep. 21, 2011, in 18 pages.
International Search Report from International Application No. PCT/US2006/048273, dated May 15, 2007, 13 pages.

\* cited by examiner

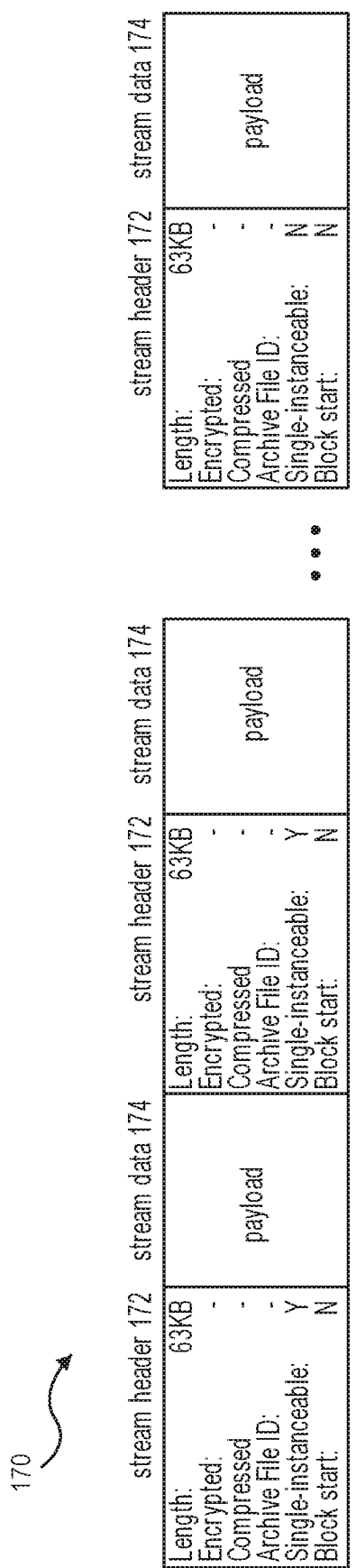
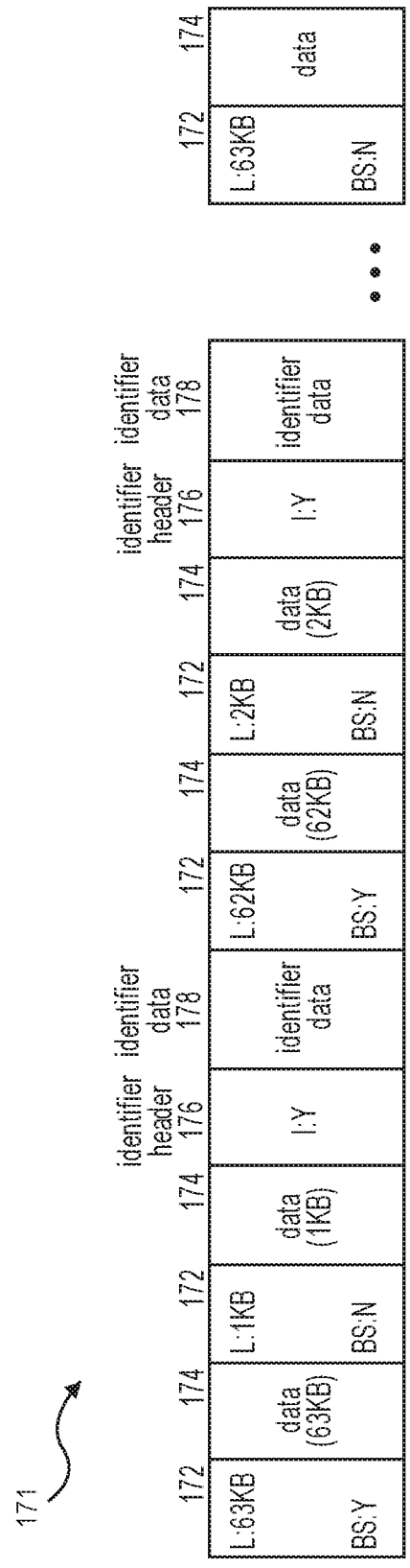
FIG. 1F
FIG. 1G

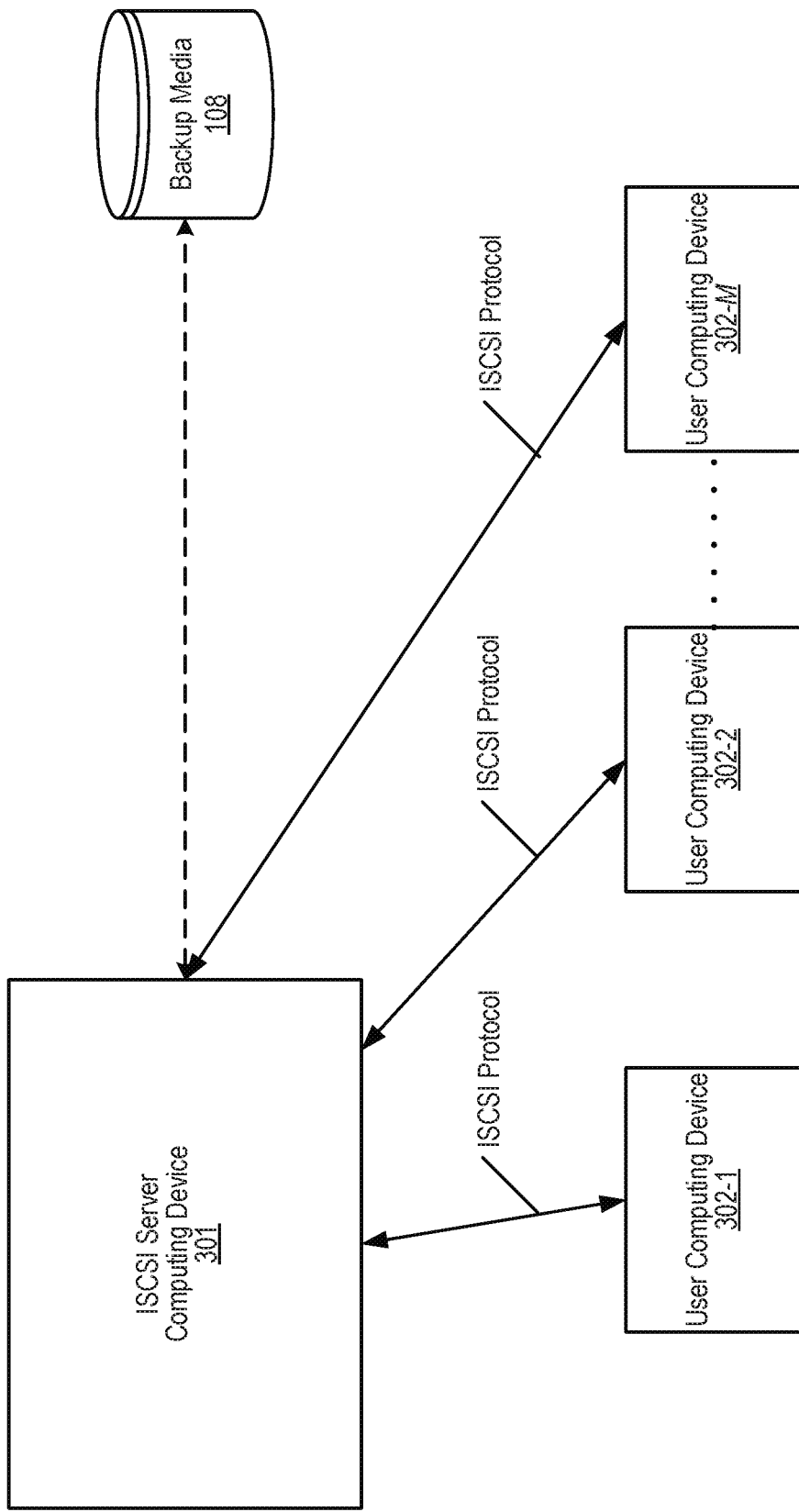
FIG. 3   System 300 Providing Block-level Live Browsing And Private Writable Environments Using An ISCSI Server Without Pseudo-disk Drivers At The User Computing Device

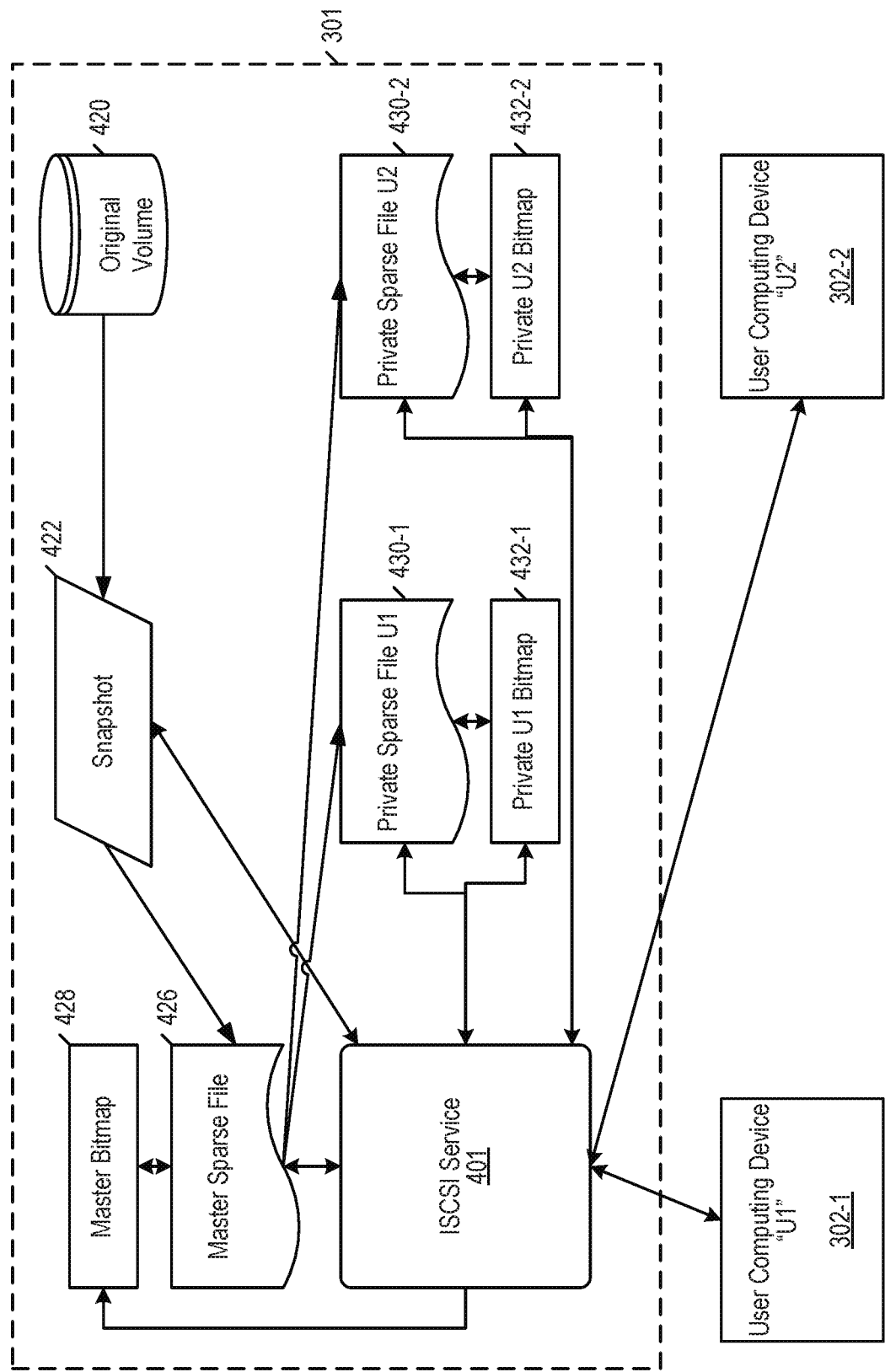
FIG. 4  System 300 Configured For Block-Level Browsing And Private Writable Snapshots Based On A Snapshot Of An Original Volume (Block-Level Device)

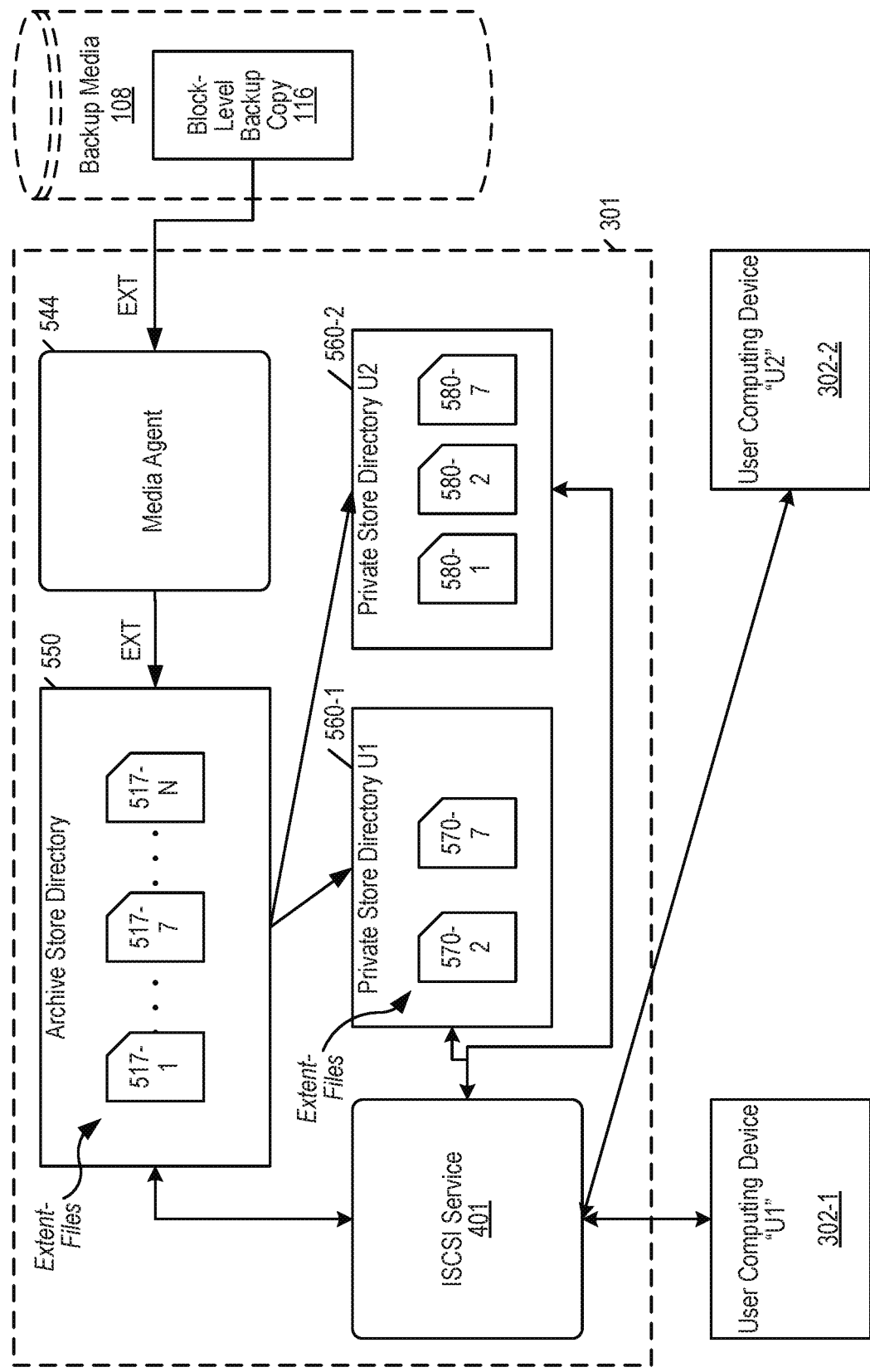
FIG. 5  System 300 Configured For Block-Level Browse And Private Writable Backup Copy Based On Extents Recalled From Block-Level Backup Copy On Backup Media

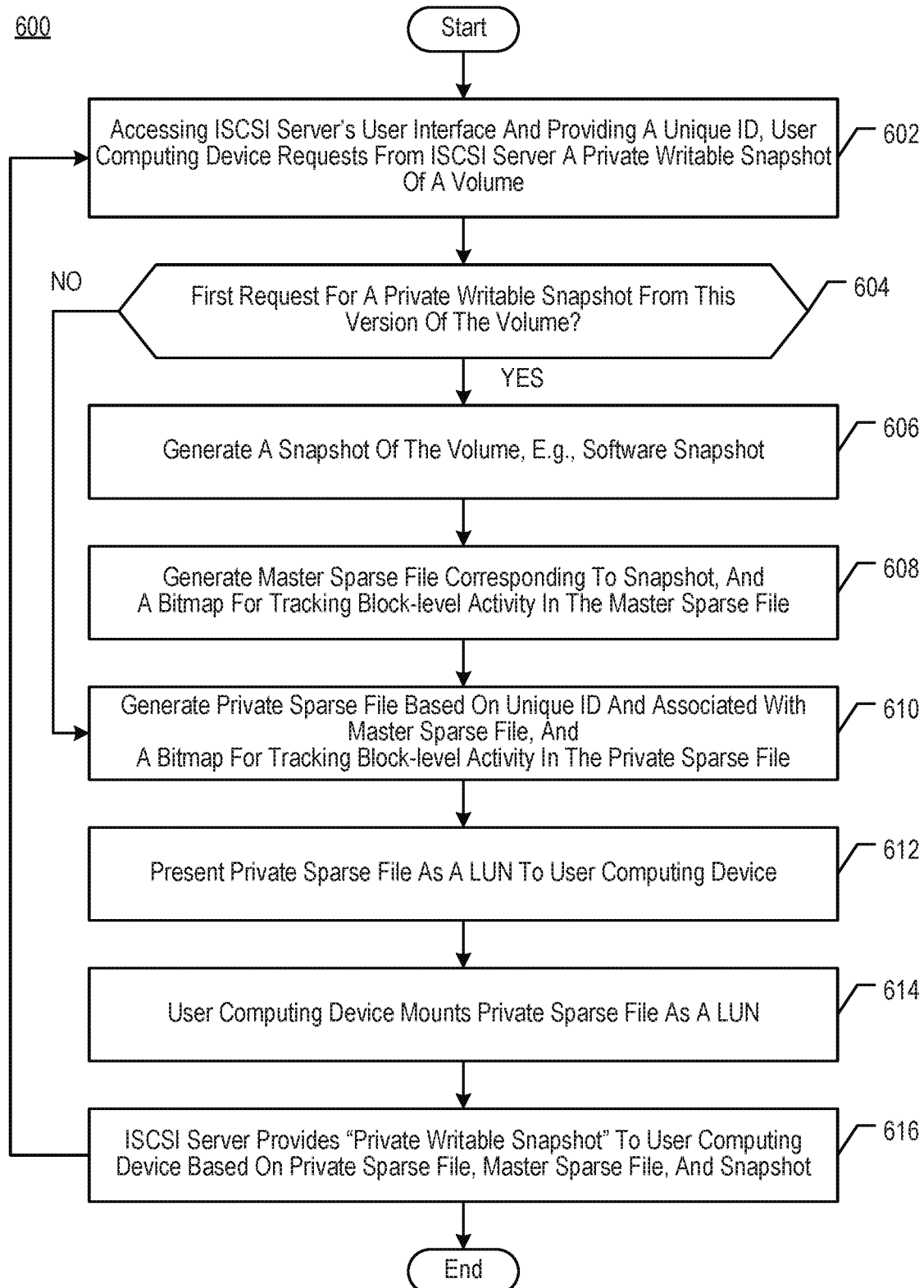
FIG. 6   Method In System 300 Configured For Private Writable Snapshots As In Figure 4

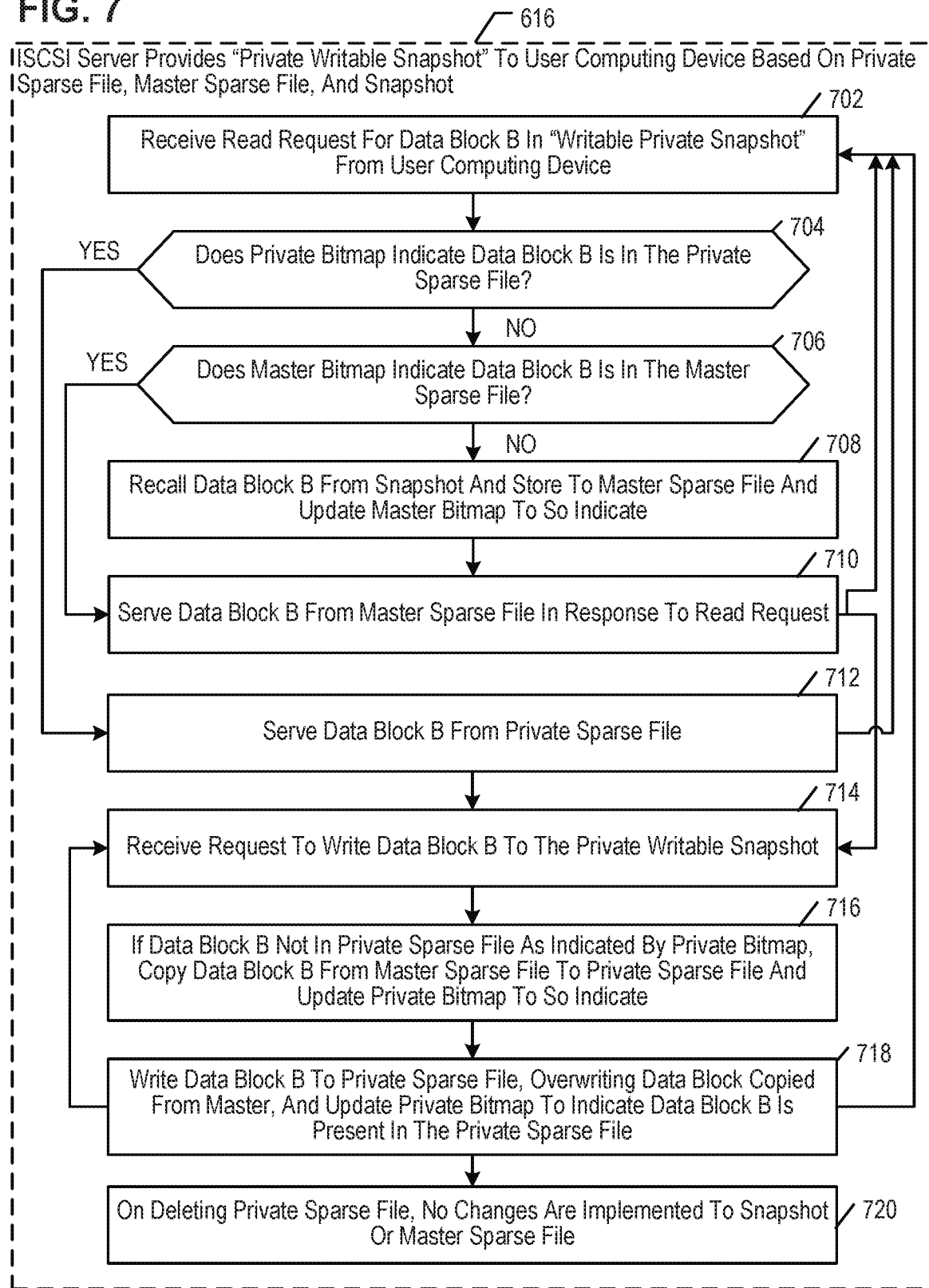

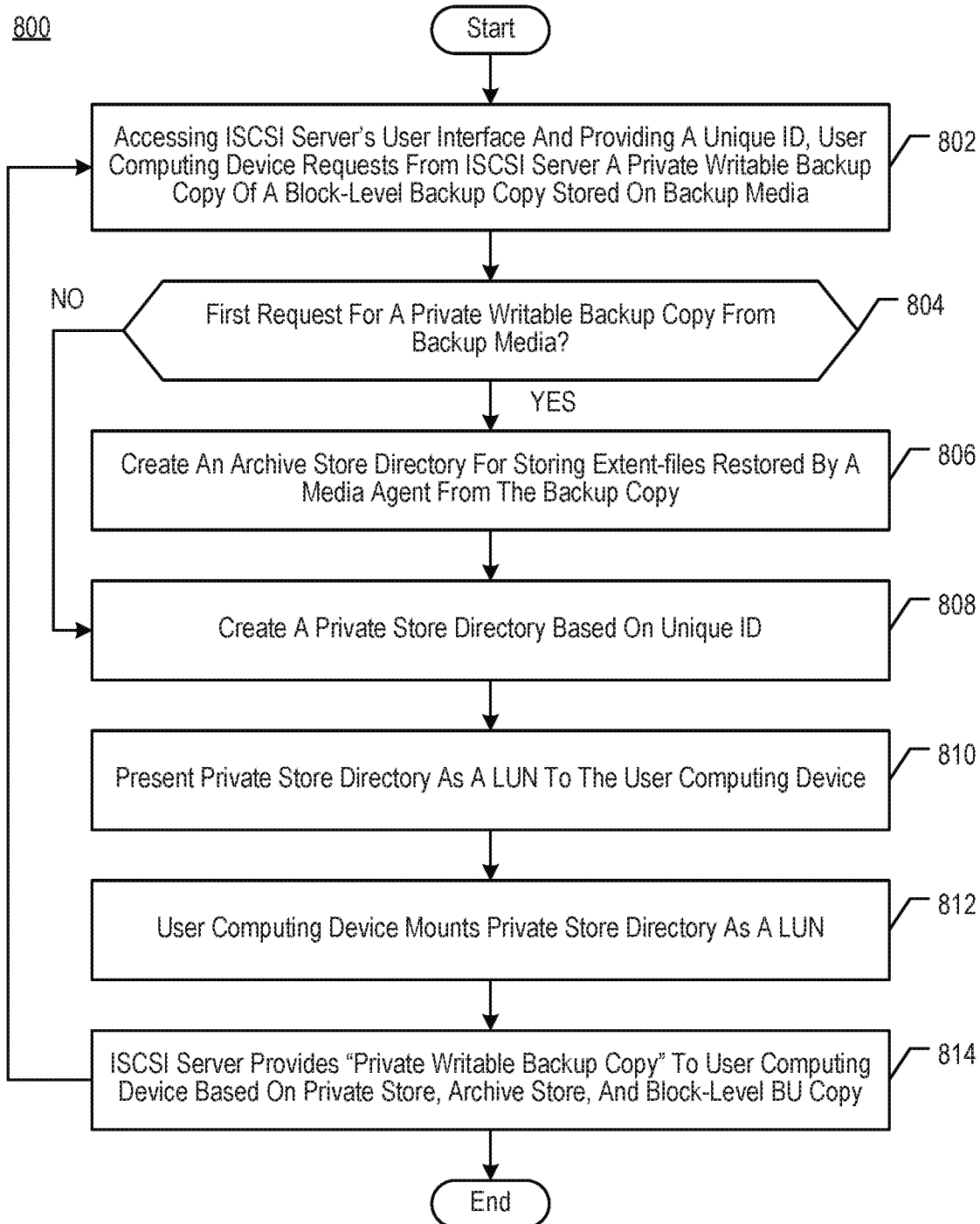
FIG. 8    Method In System 300 Configured For Private Writable BU Copy As In Figure 5

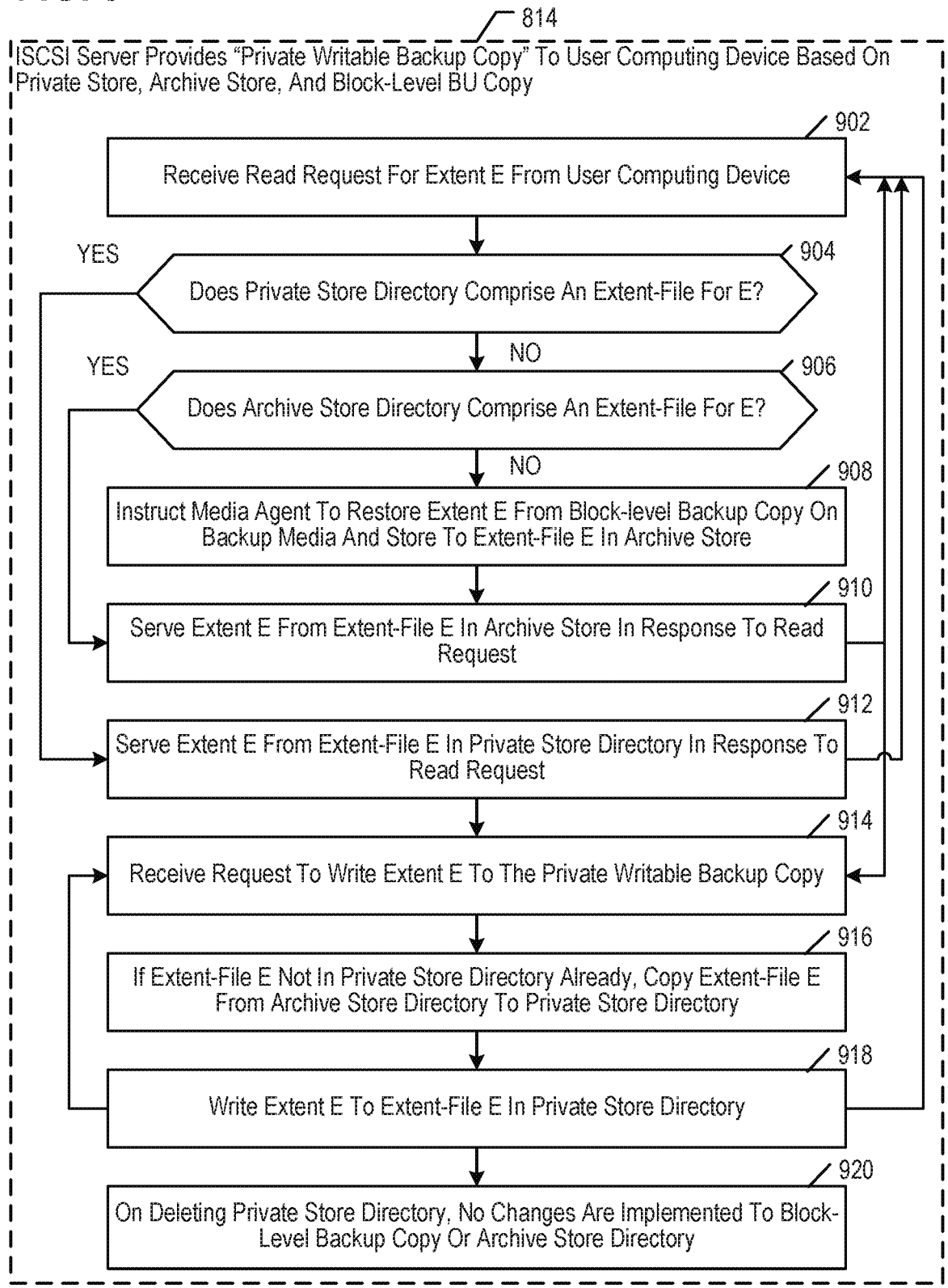

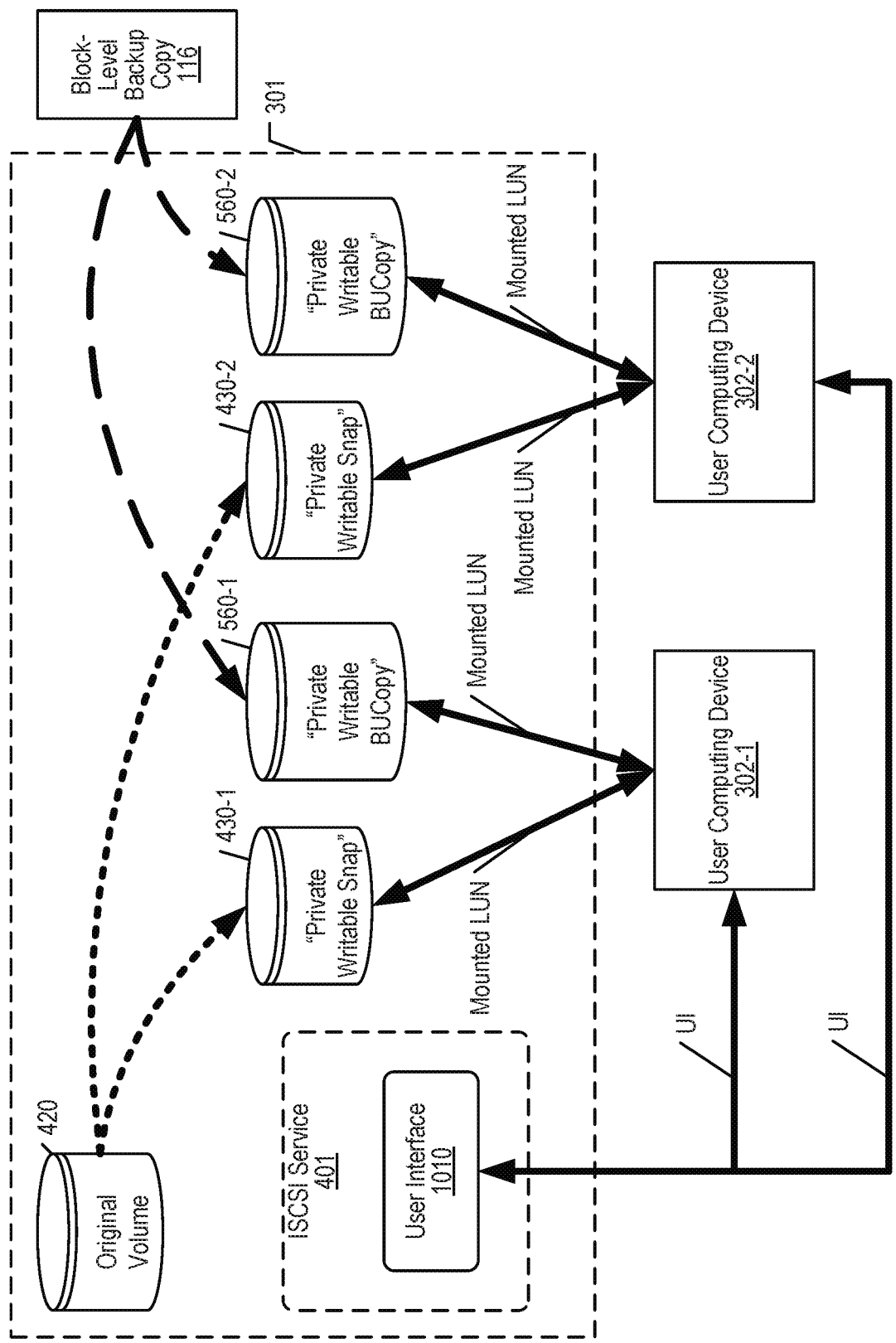
FIG. 10  User's Logical View Of System 300 Configured For Private Writable Backup Copy And Private Writable Snapshot

BLOCK-LEVEL LIVE BROWSING AND PRIVATE WRITABLE SNAPSHOTS USING AN ISCSI SERVER

INCORPORATION BY REFERENCE TO ANY PRIORITY APPLICATIONS

This application claims priority to U.S. Provisional Patent Application Ser. No. 62/630,698 filed on 14 Feb. 2018 with the title of "Block-Level Live Browse Using ISCSI without a Pseudo-Disk Driver." Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

SUMMARY

An illustrative Internet Small Computer Systems Interface server ("ISCSI server") provides user computing devices with "private writable snapshots" of a desired volume of data and/or further provides "private writable backup copies", which are derived from block-level backup copies of data stored on backup media. Collectively, these are referred to herein as "private writable environments" or "private writable workspaces." An illustrative ISCSI service, which executes on the ISCSI server, is provided without invoking snapshot limits imposed by storage arrays and further without requiring that specialized backup software and/or pseudo-disk drivers be installed on the user computing devices. Thus, the user computing devices can conveniently access the ISCSI service and need not be specially equipped and/or loaded with special-purpose software. Moreover, there is no limit on how many private writable environments each user computing device can access from a given ISCSI server. A user can have any number of co-existing private writable snapshots and private writable backup copies.

The illustrative embodiments provide for private writable environments as well as for live browsing of the source data. A user can browse block-level backup copies as well as edit personal versions of any number and/or versions of the block-level backup copies—the "private writable backup copies". Likewise, a user can browse snapshots of desired data storage volumes and edit personal versions of any number of snapshots of one or more versions of one or more desired data volumes—the "private writable snapshots". Each private writable environment is configured such that it operates independently of other similar private writable environment(s) on the same user computing and/or hosted by the same ISCSI server. Each private writable environment operates independently of the others, even when derived from the same data source (i.e., data volume and/or block-level backup copy).

Sparse files, extent-files, special-purpose directories, and/or media agents co-residing on the ISCSI server along with the ISCSI service are used in the illustrative embodiments.

There is no limit on how many user computing devices the ISCSI server can serve under the present architecture. Likewise, there is no limit on how many distinct private writable snapshots and/or private writable backup copies can be configured and serviced for any given user computing device.

In regard to live browsing block-level data sources, such as block-level backup copies and/or snapshots of data storage volumes, advantages include:

Mounting block-level backup copies (images) and/or snapshots as ISCSI LUNs to computing devices (e.g., user computing devices) that are not equipped with special purpose backup software or pseudo-disk drivers. Contrast the present solution to prior art pseudo-disk driver-based solutions described in e.g., U.S. Pat. No. 9,852,026.

Live browsing data sources without a pseudo-disk driver, i.e., a driverless solution.

ISCSI service can execute on any operating system computing device (e.g., Linux, Windows) without limitation and exposes the block-level backup copies and/or data volumes (configured as block data storage) to user computing devices having any operating system without limitation.

Advantages of the illustrative private writable environments include:

Advantages listed above in regard to live browsing.

No limit on the number of private writable snapshots and/or private writable backup copies, because storage array limitations are not invoked.

No limit on the number of mutually independent private writable workspaces (e.g., private writable snapshots, private writable backup copies), because storage array limitations are not invoked.

Storage array snapshots (so-called hardware snapshots) are not used here. Instead, so-called software snapshots taken by the ISCSI server (e.g., using ISCSI server's operating system) and presented as LUNs to user computing devices.

BRIEF DESCRIPTION OF THE DRAWINGS

FIGS. 1F-1H are block diagrams illustrating suitable data structures that may be employed by the information management system.

FIG. 3 is a block diagram of an example system 300 providing block-level live browsing and private writable environments using an ISCSI server without pseudo-disk drivers at the user computing devices, according to an illustrative embodiment of the present invention.

FIG. 4 is a block diagram depicting system 300 configured for block-level browse and private writable snapshots based on a snapshot of an original volume (configured as a block-level device).

FIG. 5 is a block diagram depicting system 300 configured for block-level browse and private writable backup copy based on extents recalled from a block-level backup copy on backup media.

FIG. 6 is a flow chart depicting salient operations of a method 600 that executes in system 300 configured for private writable snapshots as exemplified in FIG. 4.

FIG. 7 is a flow chart depicting certain operations in block 616 of method 600.

FIG. 8 is a flow chart depicting salient operations in a method 800 that executes in system 300 configured for private writable backup copies as exemplified in FIG. 5.

FIG. 9 is a flow chart depicting certain operations in block 814 of method 800.

FIG. 10 is a block diagram depicting a user's logical view of system 300 configured for private writable backup copy and private writable snapshot.

DETAILED DESCRIPTION

Detailed descriptions and examples of systems and methods according to one or more illustrative embodiments of the present invention may be found in the section entitled BLOCK-LEVEL LIVE BROWSING, PRIVATE WRITABLE SNAPSHOTS, AND PRIVATE WRITABLE BACKUP COPIES USING AN ISCSI SERVER WITHOUT PSEUDO-DISK DRIVERS AT THE USER COMPUTING DEVICES, as well as in the section entitled Example Embodiments, and also in FIGS. 3-10 herein. Furthermore, components and functionality for providing block-level live browsing and private writable environments using an ISCSI server without pseudo-disk drivers at the user computing devices may be configured and/or incorporated into information management systems such as those described herein in FIGS. 1A-1H and 2A-2C.

Various embodiments described herein are intimately tied to, enabled by, and would not exist except for, computer technology. For example, communicating via the ISCSI protocol, taking snapshots of data storage volumes, restoring portions of backed up data, conditionally searching for and obtaining/restoring relevant data as described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
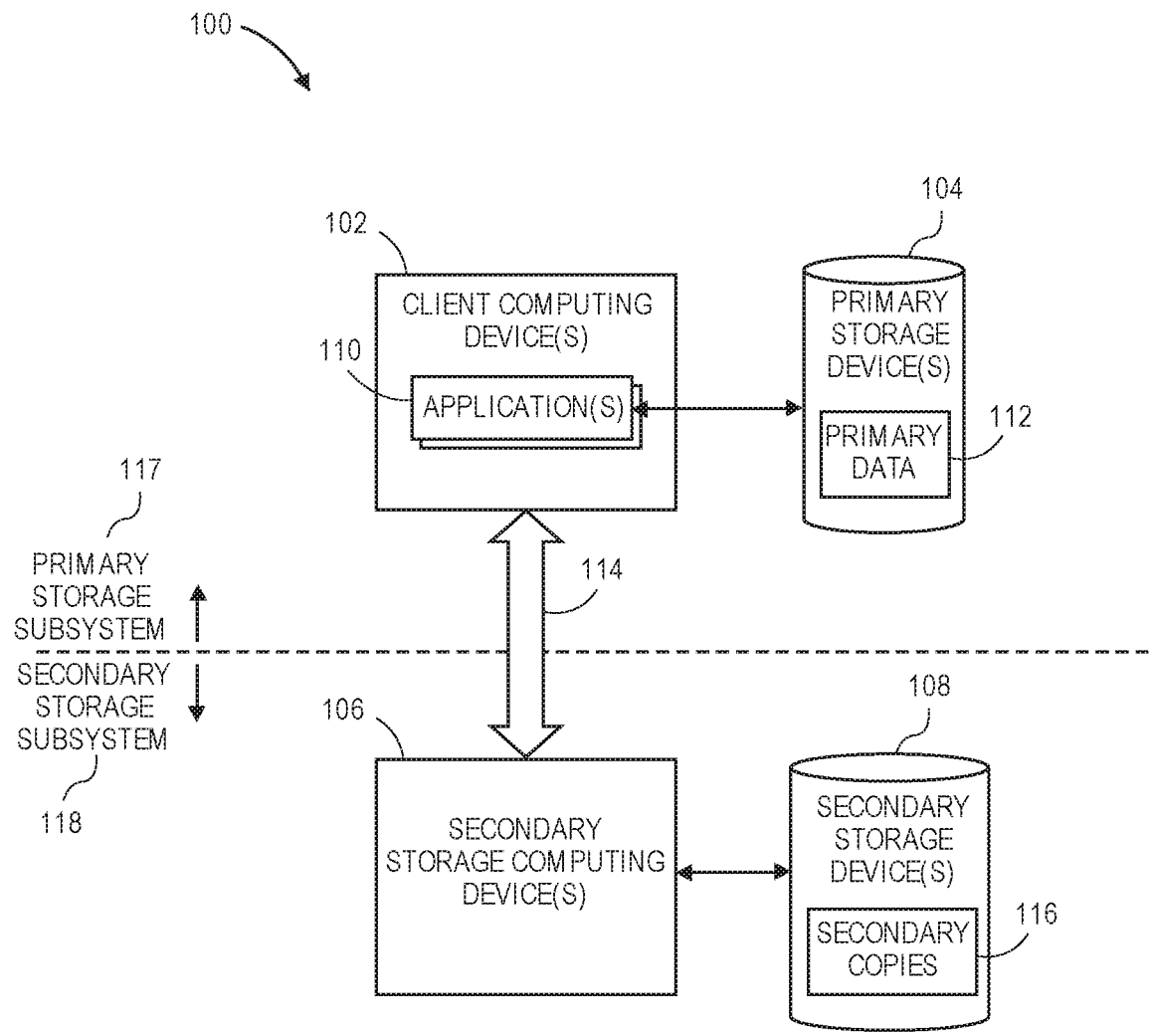
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,734,669, entitled "Managing Copies Of Data";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. No. 9,852,026, entitled "Efficient Application Recovery In An Information Management System Based On A Pseudo-Storage-Device Driver";

U.S. Pat. Pub. No. 2006/0224846, entitled "System and Method to Support Single Instance Storage Operations";

U.S. Pat. Pub. No. 2014/0201170, entitled "High Availability Distributed Deduplicated Storage System";

U.S. patent application Ser. No. 14/721,971, entitled "Replication Using Deduplicated Secondary Copy Data";

U.S. Patent Application No. 62/265,339 entitled "Live Synchronization and Management of Virtual Machines across Computing and Virtualization Platforms and Using Live Synchronization to Support Disaster Recovery";

U.S. Patent Application No. 62/273,286 entitled "Redundant and Robust Distributed Deduplication Data Storage System";

U.S. Patent Application No. 62/294,920, entitled "Data Protection Operations Based on Network Path Information";

U.S. Patent Application No. 62/297,057, entitled "Data Restoration Operations Based on Network Path Information"; and U.S. Patent Application No. 62/387,384, entitled "Application-Level Live Synchronization Across Computing Platforms Including Synchronizing Co-Resident Applications To Disparate Standby Destinations And Selectively Synchronizing Some Applications And Not Others".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1B:
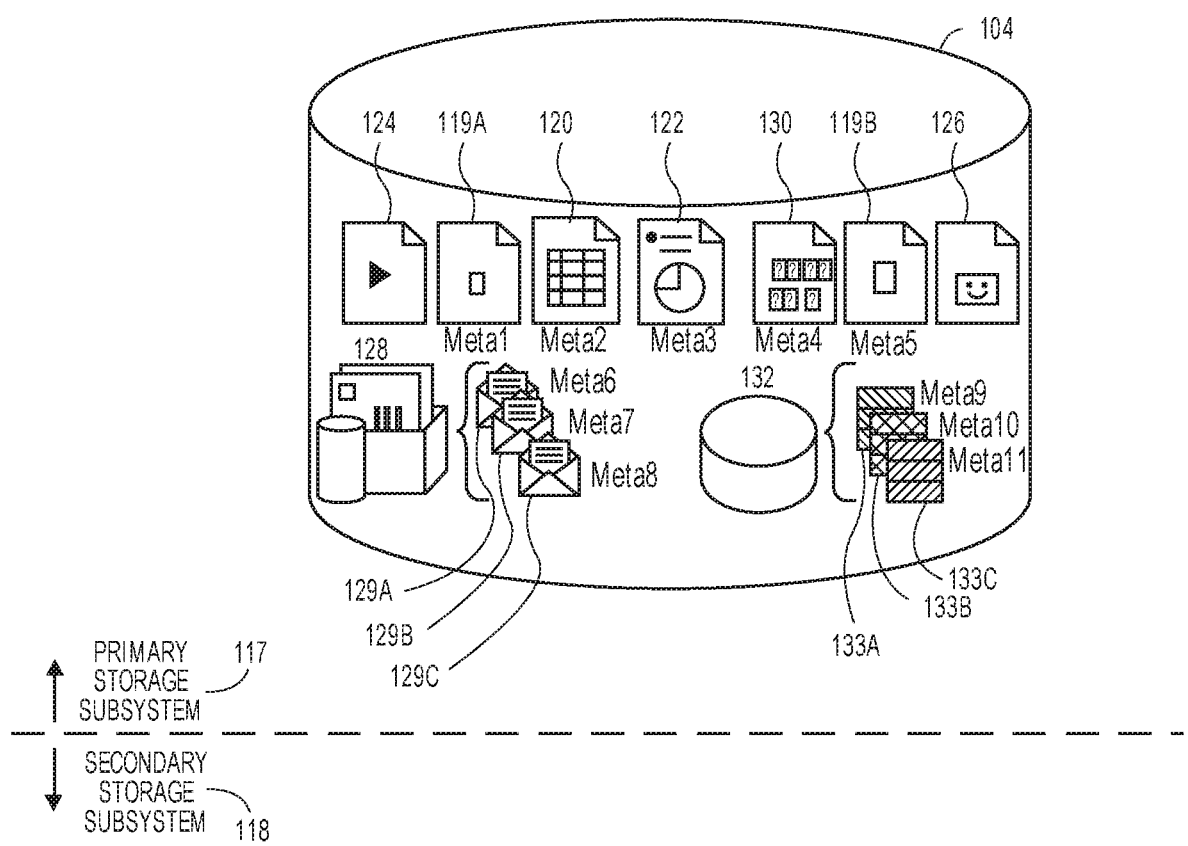
FIG. 1B is a detailed view of a primary storage device, a secondary storage device, and some examples of primary data and secondary copy data.
Figure 1B:
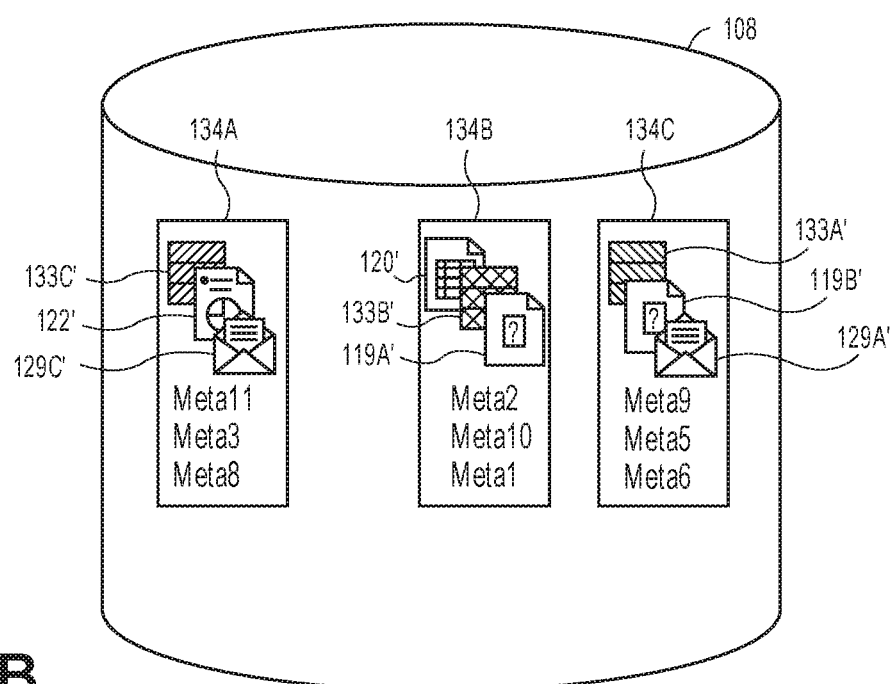
Figure 1C:
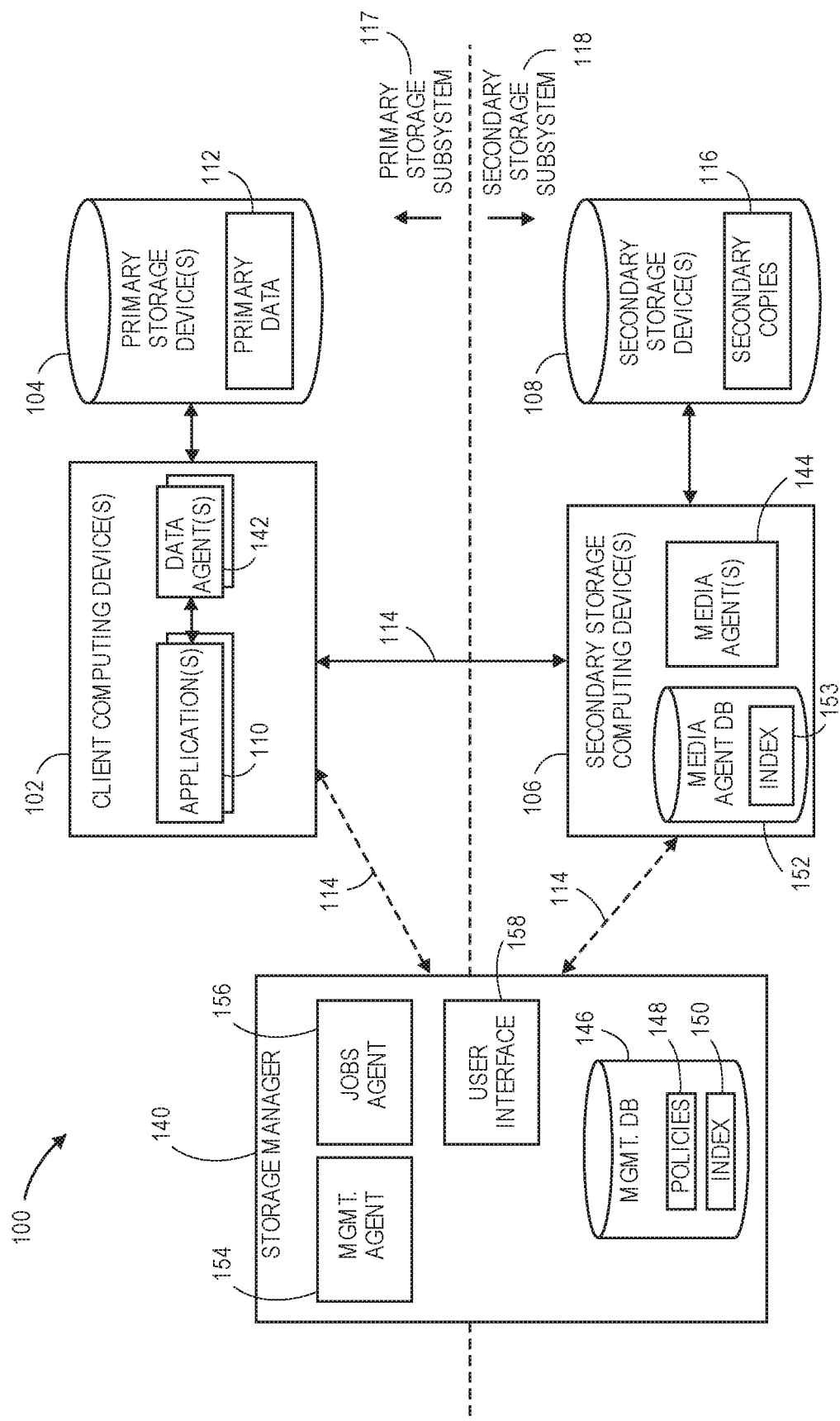
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing ongoing organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
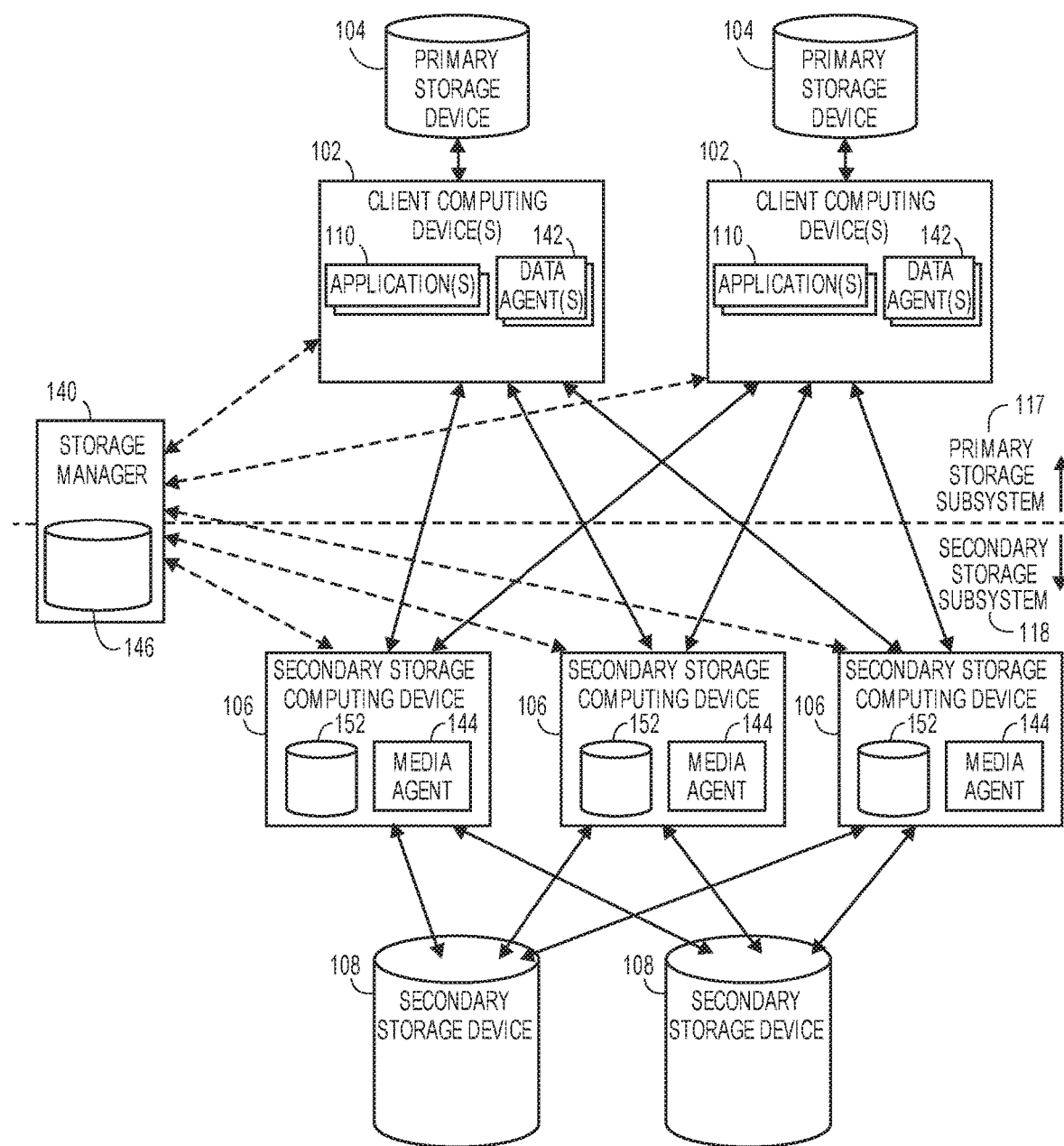
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Copy Operations

Figure 1E:
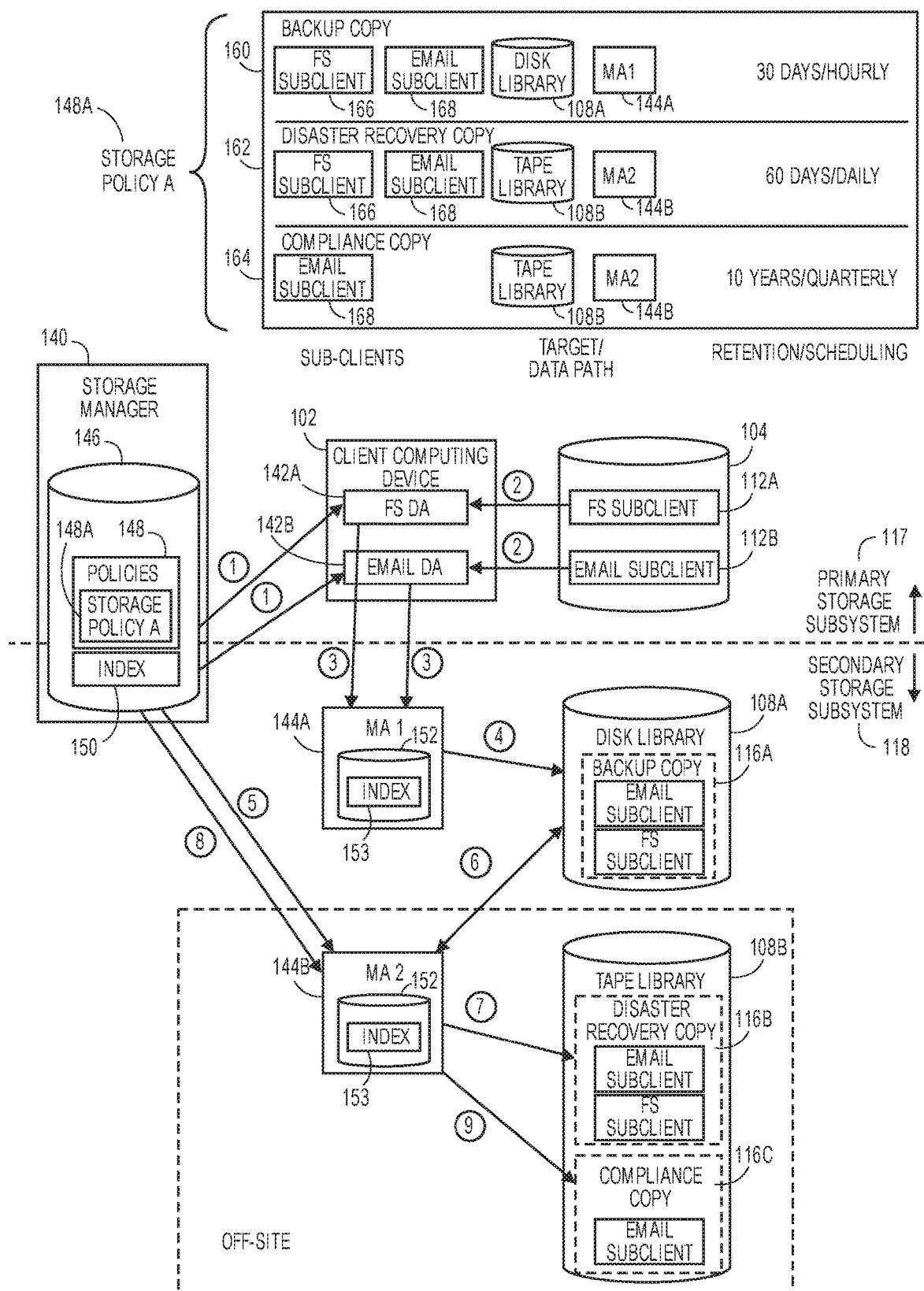
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 1428 operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
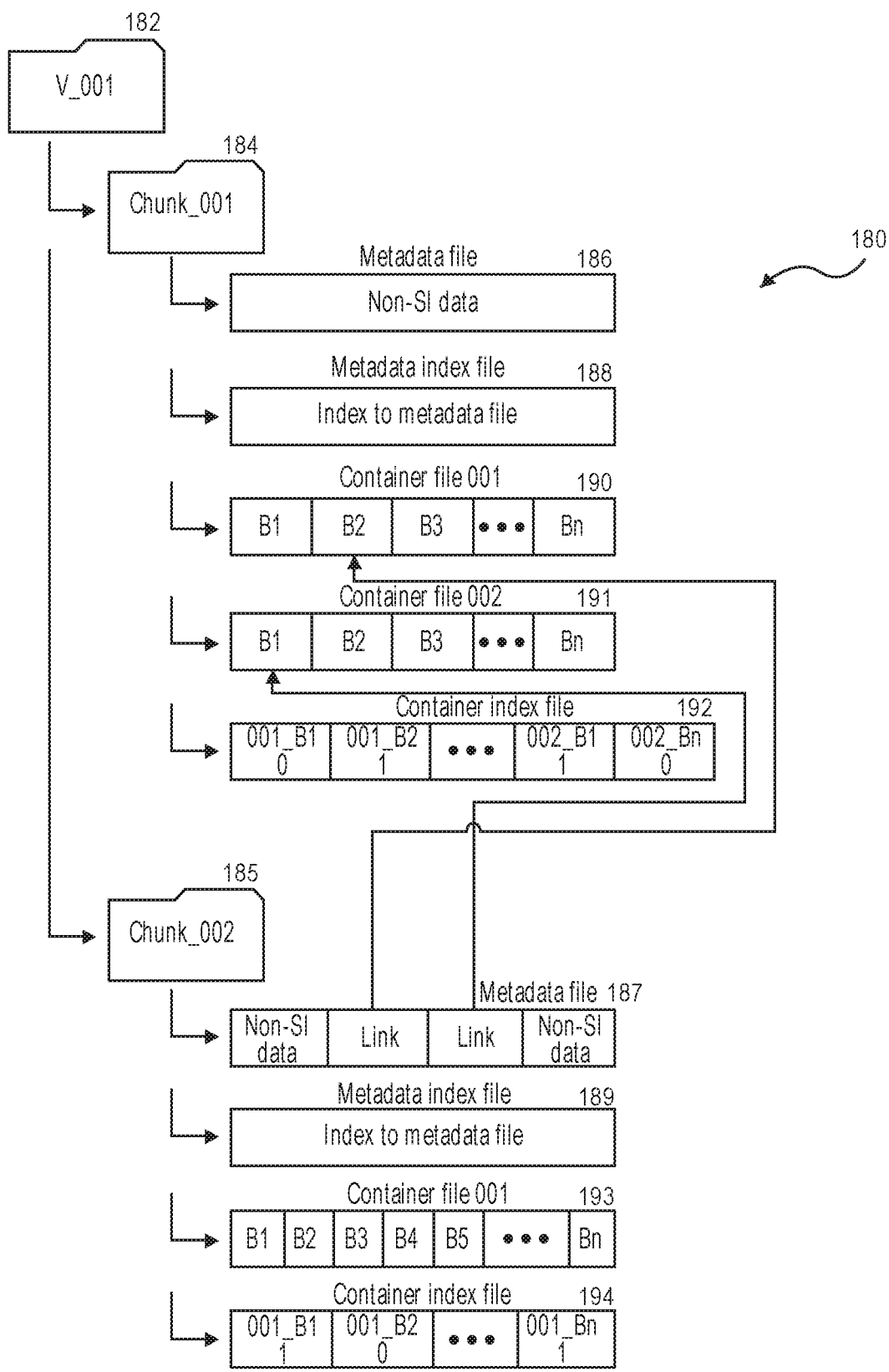

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
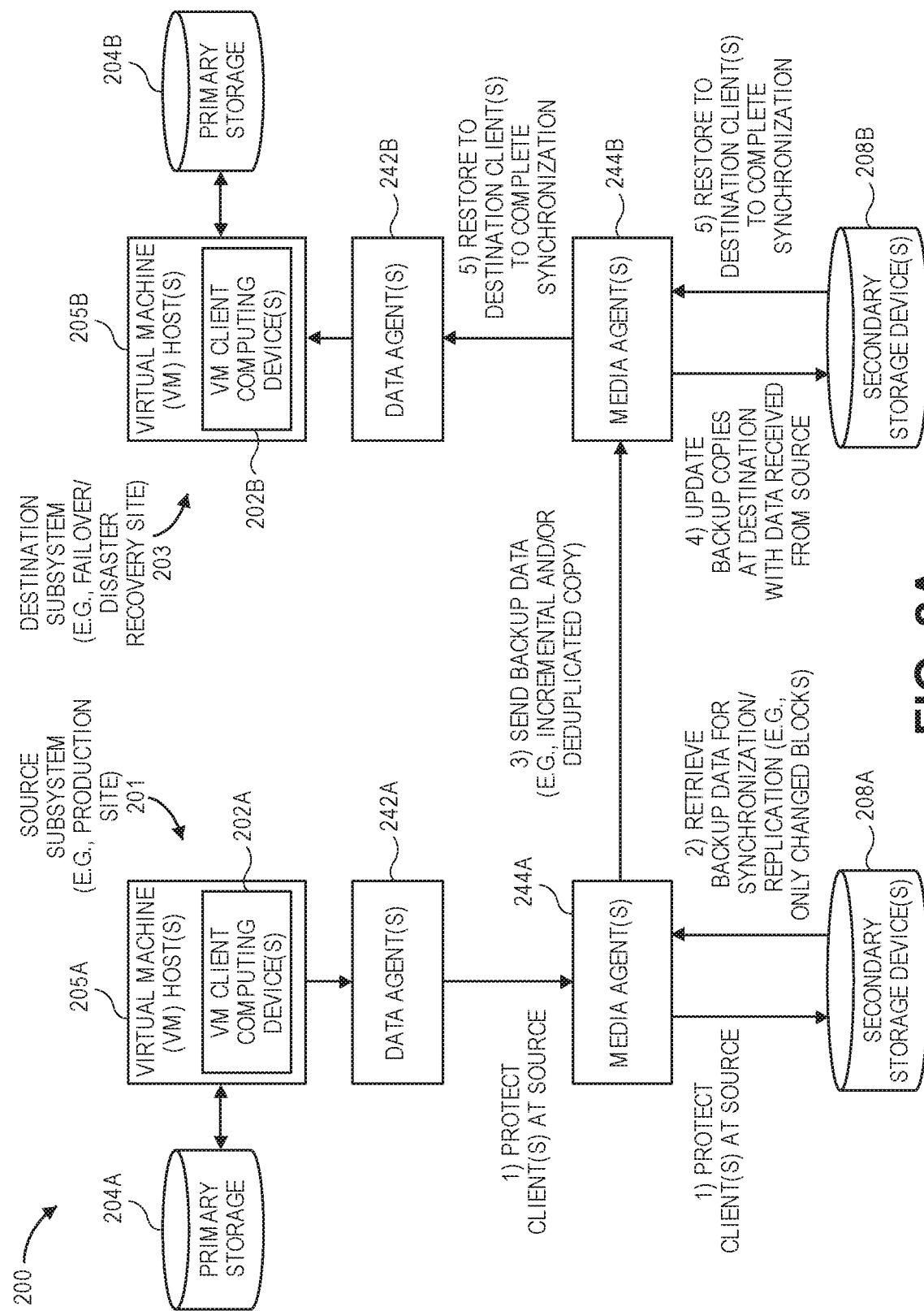
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
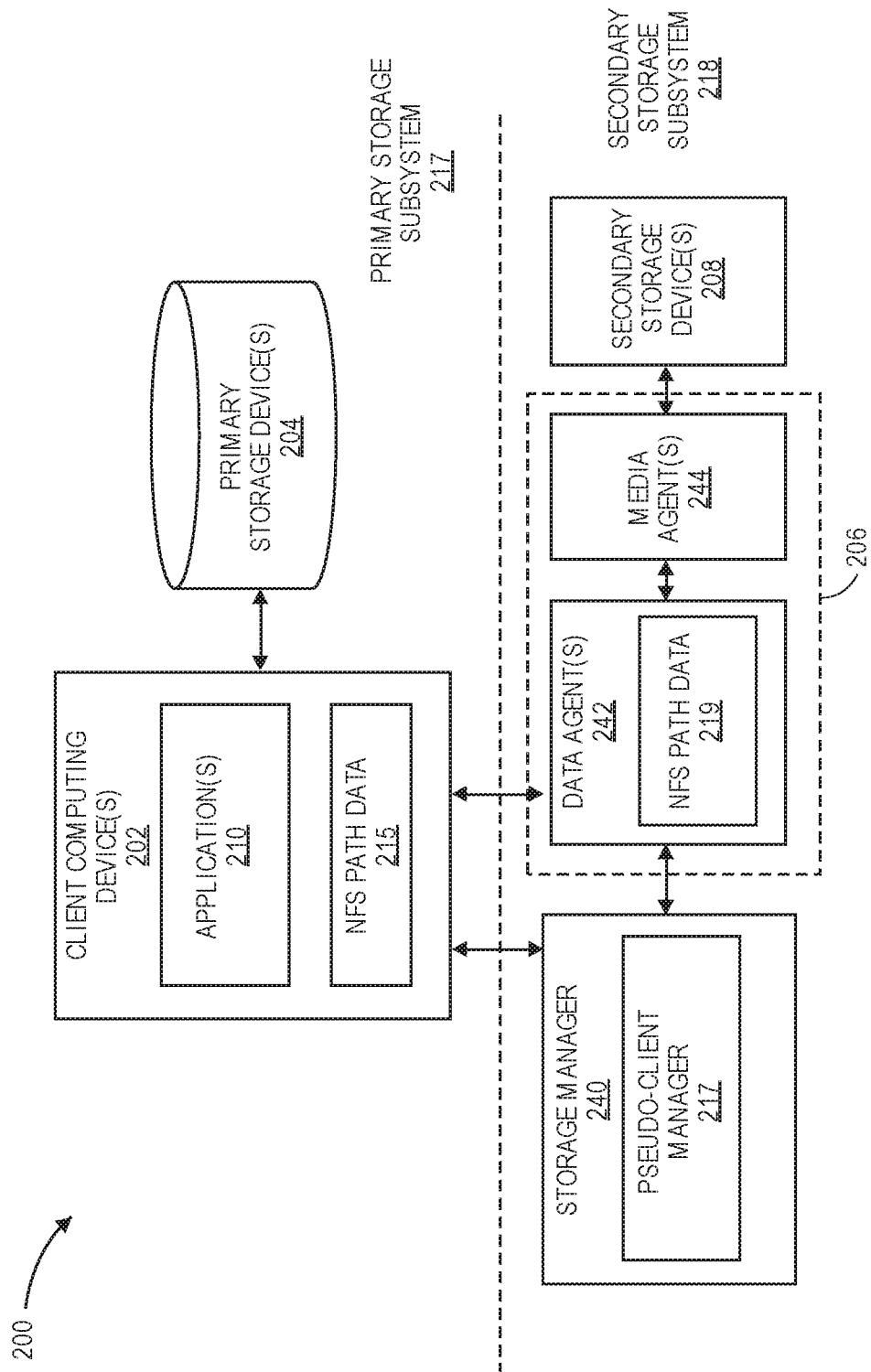
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
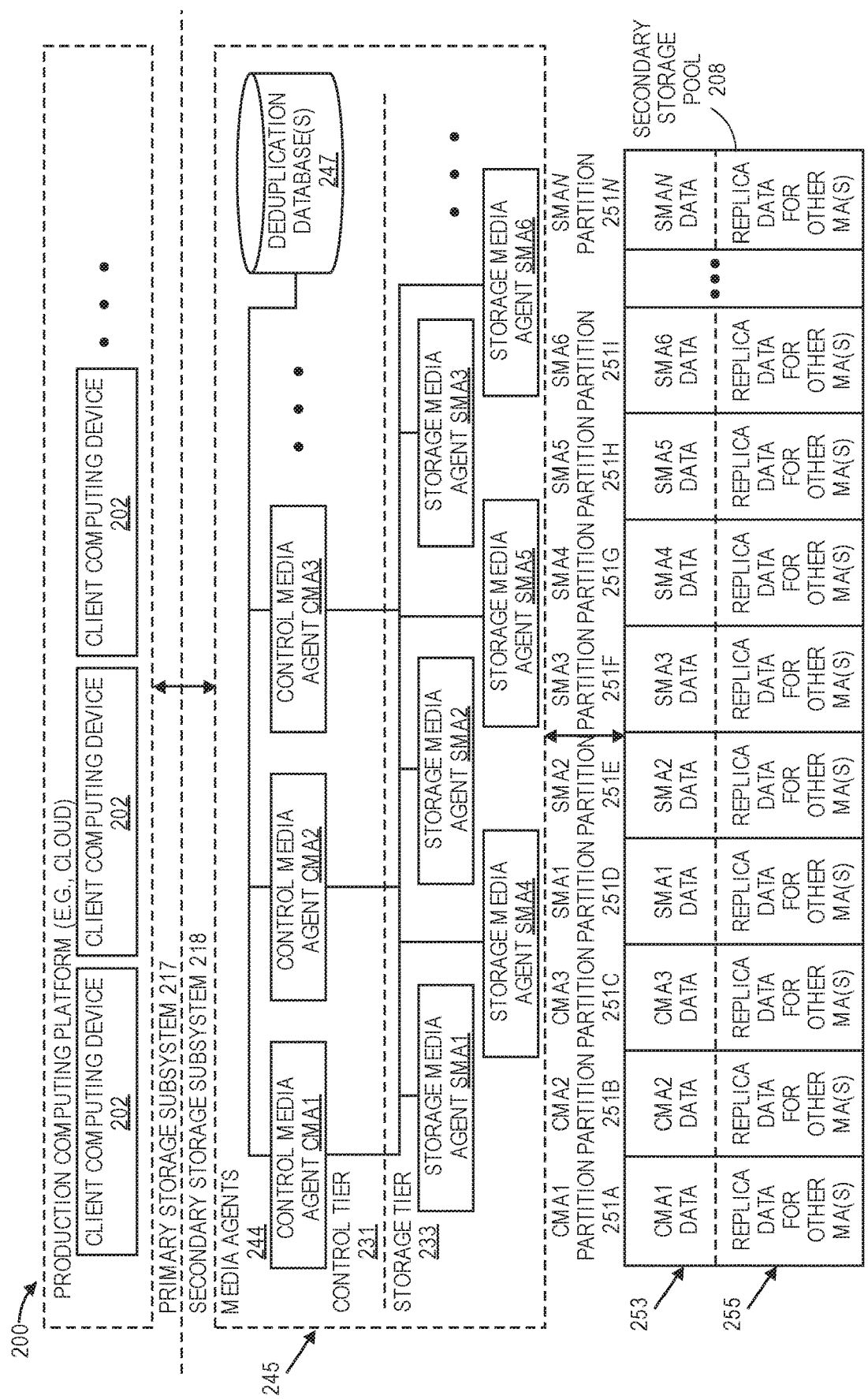
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Block-Level Live Browsing, Private Writable Snapshots, and Private Writable Backup Copies Using an Iscsi Server without Pseudo-Disk Drivers at the User Computing Devices An illustrative ISCSI server 301 provides user computing devices 302 with "private writable snapshots" 430 of a desired volume of data 420 (configured as block-level storage) and/or further provides "private writable backup copies" 560, which are derived from a block-level backup copy of data 116 stored in backup media 108. The illustrative ISCSI service 401, which executes on ISCSI server 301, is provided without invoking snapshot limits imposed by storage arrays and further without using specialized backup software and/or pseudo-disk drivers installed on user computing devices 302. The illustrative functionality primarily resides in the ISCSI server and is agnostic of the ISCSI server's operating system and user computing devices' 302 respective operating systems. A user can browse as well as edit personal versions of any number and/or versions of block-level backup copies—the "private writable backup copies" 560. Likewise, a user can browse and edit personal versions of any number of snapshots of one or more versions of one or more desired data volumes—the "private writable snapshots" 430. Accordingly, the illustrative embodiments provide for private writable environments (e.g., 430, 560) as well as for live browsing of existing data (e.g., 420, 116, respectively).

Sparse files (e.g., 426, 430), snapshots (e.g., 422), extent-files (e.g., 517, 570, 580), special-purpose directories (e.g., 550, 560), and/or media agents 544 co-residing on the ISCSI server 301 along with ISCI service module 401 are used in the illustrative embodiments. There is no limit on how many user computing devices 302 an ISCSI server 301 can service under the present architecture. Likewise, there is no limit on how many distinct private writable snapshots 430 and/or private writable backup copies 560 can be configured and serviced on ISCSI server 301 for any given user computing device 302. Each private writable snapshot 430 and private writable backup copy 560 operates independently of other private writable workspaces accessible to a given user computing device 302.

FIG. 3 is a block diagram of an example system 300 providing block-level live browsing and private writable environments using ISCSI server 301 without pseudo-disk drivers at the user computing devices 302, according to an illustrative embodiment of the present invention. As shown in FIG. 3, system 300 comprises: ISCSI server computing device 301 in communication with backup media 108, and further in communication with a plurality of user computing devices 302 (e.g., 302-1, 302-2 . . . 302-M). Other components, such as storage manager 140, data agents 142, client computing devices 102, which are shown in other figures herein (e.g., FIG. 1A, 1C) are part of system 300, but are not necessary for the operation of the illustrative embodiment.

Backup media 108 (used interchangeably herein with "data storage device 108") is a data storage device or devices that is configured for storing data, and illustratively for storing secondary copies of data, such as backup copies, which are relevant to the illustrative embodiment. Data storage device 108, which is described in more detail elsewhere herein, is any storage device and storage technology suitable for storing secondary copies 116, without limitation.

ISCSI server computing device 301 (or "ISCSI server 301") is a computing device comprising one or more processors and computer memory. ISCSI server 301 is responsible, e.g., by executing ISCSI service module 401, for many of the features of the illustrative embodiment, as explained in more detail in subsequent figures.

As shown by the dashed line connecting backup media 108 and ISCSI server 301, ISCSI server 301 is in communication with backup media 108 in certain configurations, but not in others—hence the dashed line. For example, no backup media 108 is required in the illustrative embodiment depicted in FIG. 4. On the other hand, backup media 108 is used in the illustrative embodiment shown in FIG. 5.

Each user computing device 302 (e.g., 302-1, 302-2 . . . 302-M) is a computing device comprising one or more processors and computer memory. Illustratively, each user computing device 302 communicates with ISCSI server 301 via ISCSI protocol, and thus the connection therebetween uses a public and/or private Internet Protocol (IP)-based network. ISCSI protocol is well known in the art. There is no limit on how many user computer devices 302 can be served by ISCSI server 301. As explained in more detail in FIG. 10 herein, an illustrative user computing device 302 "sees" private writable snapshots and/or private writable backup copies on ISCSI server 301 and lacks its own local data storage, though the invention is not so limited. User computing devices 302 require no special-purpose backup software, such as a data agent 142 or a media agent 144, and further require no pseudo-disk drivers in order to access, read from, write to, and otherwise manipulate one or more private writable snapshot(s) 430 and/or private writable backup copy(ies) 560. This advantageously enables user computing devices 302 to conveniently gain access to the private writable environments described herein.

The physical infrastructure needed to support the connectivity shown in this and other figures herein is well known in the art and comprises any suitable electronic data communications facilities, components, and protocols sufficient to enable the functionality described herein.

FIG. 4 is a block diagram depicting system 300 configured for block-level browsing and private writable snapshots based on a snapshot of an original volume (configured as a block-level device). FIG. 4 depicts: ISCSI server 301 comprising: ISCSI service module 401, original data volume 420, snapshot 422, master sparse file 426, master bitmap 428, private sparse file U1 430-1, private sparse file U2 430-2, private U1 bitmap 432-1, and private U2 bitmap 432-2; user computing device "U1" 302-1; and user computing device "U2" 302-2 in communication with ISCSI service module 401.

ISCSI service module 401 (or "ISCSI service 401") is a functional component of ISCSI server 301, illustratively implemented as executable software that executes on ISCSI server computing device 301, thus providing ISCSI server 301 with many of the features described herein, e.g., communicating via ISCSI protocol with user computing devices 302; instructing ISCSI server 301 to take snapshot 422; creating master sparse file(s) 426 and associated respective bitmap(s) 428; creating private sparse file(s) 430 and associated respective bitmap(s) 432; copying data blocks to master sparse files 426 and private sparse files 430 and updating associated respective bitmaps 428 and 432 accordingly; checking bitmaps 426 and 432; receiving and analyzing read and write requests from user computing devices 302 and serving responses thereto; providing a user interface 1010 to user computing devices 302 for requesting and accessing private writable snapshots; etc. Additionally, features described in regard to FIG. 5 and private writable backup copies also are largely provided by ISCSI service 401 and are described in more detail in FIG. 5. The configurations of FIG. 4 and FIG. 5 are mutually compatible and can co-exist in any combination and permutation without limitation.

Because ISCSI service 401 executes on ISCSI server 301, ISCSI server 301 is said to provide ISCSI service to user computing devices 302 according to one or more illustrative embodiments. In alternative embodiments, ISCSI service 401 is implemented as executable firmware and/or a combination of software and firmware, without limitation. ISCSI service 401 is shown herein as a distinct component to ease understanding of the present disclosure, however, alternative embodiments are also possible within the scope of the present invention. For example, ISCSI service 401 may be combined with or layered within media agent 544 code; in such a configuration media agent 544 provides the functionality depicted here as ISCSI service 401. See also FIG. 5.

Original data volume 420 (or "volume 420") is a data volume configured as block-level data storage comprising any data that is of interest to user computing devices 302. For example, volume 420 may comprise data created for a research project, a software development code base, creative content, or any content whatsoever without limitation. According to the illustrative embodiment, system 300 configured as shown here isolates the content of volume 420 from the "private writable" changes implemented by user computing devices 302 while also providing user computing devices 302 with the ability to live browse the content of volume 420 and further to implement their own private writable workspaces derived from volume 420.

Snapshot 422 is a snapshot data structure illustratively taken and generated by ISCSI server 301 using native utilities, such as operating system features that are well known in the art and which take a so-called "software snapshot" (described in more detail elsewhere herein). Snapshot 422 represents a point-in-time copy of volume 420 and thus comprises all the content of volume 420 at the time that the snapshot is taken, as indicated by the one-way arrow from volume 420 to snapshot 422. Any number of successive snapshots 422 can be taken at various points-in-time to capture what is stored in volume 420. For example, in a constantly changing research or development environment, snapshot 422 is taken every time a new version of data is stored to volume 420. Snapshot 422 becomes a source of data for the operations described herein and therefore multiple snapshots 422 can each serve as a unique and distinct source of data.

Master sparse file 426 is a sparse file data structure that is generated by ISCSI server 301 to correspond in size to snapshot 422. Sparse files are well known in the art. A "sparse file is a type of computer file that attempts to use file system space more efficiently when the file itself is partially empty . . . by writing brief information (metadata) representing the empty blocks to disk instead of the actual 'empty' space which makes up the block, using less disk space. The full block size is written to disk as the actual size only when the block contains 'real' (non-empty) data . . . . The advantage of sparse files is that storage is only allocated when actually needed[ ]." (https://en.wikipedia.org/wiki/Sparse_file, accessed on 24 Apr. 2018). Thus, master sparse file 426 is empty when first created, but over time becomes populated with data blocks copied from snapshot 422, as represented by the one-way arrow from snapshot 422 to master sparse file 426. According to the illustrative embodiment, master sparse file 426 is first created on a first-time request for a private writable snapshot based on volume 420. Subsequent such requests are served from the same master sparse file 426. See also FIG. 6.

Master bitmap 428 is a data structure that is closely associated with master sparse file 426. Master bitmap 428 is created and maintained by ISCSI server 301 (e.g., using ISCSI service 401). Master bitmap 428 comprises bits of information each of which tracks a corresponding data block in master sparse file 426. Each bit indicates whether the corresponding data block it is tracking is actually present in master sparse file 426. Initially, all bits in bitmap 428 indicate that the respective data block is not present in master sparse file 426. When a given data block is copied from snapshot 422 to master sparse file 426, ISCSI service 401 updates the corresponding bit in bitmap 428 to so indicate. In the future, when ISCSI service 401 needs to retrieve a data block, it checks master bitmap 428 to determine whether the sought-after data block is present in master sparse file 426, and if not, ISCSI service 401 retrieves the sought-after data block from snapshot 422, copies the sought-after data block to master sparse file 426, and updates master bitmap 428 accordingly. See also FIG. 7.

Private sparse files 430 (e.g., U1 430-1, U2 430-2) are the private environments or workspaces that are directly accessible to user computing devices 302. Thus, a user's private writable snapshot according to the illustrative embodiment is actually implemented as a private sparse file 430 as described herein. Like master sparse file 426, private sparse file 430 is also a sparse file data structure. Illustratively, private sparse file U1 430-1 is configured for and accessible to user computing device "U1" 302-1; and private sparse file U2 430-2 is configured for and accessible to user computing device "U2" 302-2. A logical view from the user's perspective is shown in FIG. 10.

According to the illustrative embodiment, a private sparse file 430 is created on demand, when ISCSI service 401 receives a request for a private writable snapshot accompanied by and/or comprising a unique identifier (ID) for the private writable snapshot. In response, ISCSI service 401 creates private sparse file 430, giving it the unique ID and associating it with master sparse file 426, which in turn is associated with snapshot 422, which represents a certain point-in-time version of volume 420. This chain of associations is evident from the one-way arrows from original volume 420 to snapshot 422 to master sparse file 426 to private sparse files 430-1 and 430-2. Thus, both private sparse files 430-1 and 430-2 are associated with master sparse file 426, and therefore derive from the same version of volume 420 as captured in snapshot 422. Another version of volume 420 would have its own distinct snapshot 422 and corresponding master sparse file 426, which in turn would be associated with other distinct private sparse files 430 derived from the other version of volume 420.

Private bitmap 432 (e.g., private U1 bitmap 432-1, private U2 bitmap 432-2) is closely associated with a private sparse file 430, e.g., 430-1, and 430-2, respectively. Private bitmap 432 is created and maintained by ISCSI server 301 (e.g., using ISCSI service 401). Private bitmap 432 comprises bits of information each of which tracks a corresponding data block in its associated private sparse file 430. Each bit indicates whether the data block it is tracking is actually present in private sparse file 430. Initially, all bits in bitmap 432 indicate that the corresponding data block is not present in private sparse file 430. When a given data block is copied from master sparse file 426 to private sparse file 430, ISCSI service 401 updates the corresponding bit in bitmap 432 to so indicate. In the future, when ISCSI service 401 needs to retrieve a data block, it checks private bitmap 432 to determine whether the sought-after data block is present in the associated private sparse file 430, and if not, ISCSI service 401 retrieves the sought-after data block from master sparse file 426. See also FIG. 7.

FIG. 5 is a block diagram depicting system 300 configured for block-level browse and private writable backup copy based on extents recalled from block-level backup copy on backup media. FIG. 5 depicts: backup media 108 comprising one or more block-level backup copies 116; ISCSI server 301 comprising: ISCSI service module 401, media agent 544, archive store directory 550 comprising extent-files 517, private store directory U1 560-1 comprising extent-files 570, and private store directory U2 560-2 comprising extent-files 580; user computing device "U1" 302-1; and user computing device "U2" 302-2 in communication with ISCSI service module 401. Backup media 108, ISCSI server 301, and user computing devices 302 are described elsewhere herein.

Block-level backup copy 116 is a secondary copy made from a source of data (not shown) and stored to backup media in a block-level backup format as described in more detail elsewhere herein. Data from block-level backup copy 116 is restored in groups of data blocks called "extents." This is depicted by the one-way arrow from block-level backup copy 166 to media agent 544 accompanied by the "EXT" label. Illustratively, extents are sized at 4 MB, though the invention is not so limited. According to the illustrative embodiment, system 300 configured as shown here isolates backup copy 116 from changes implemented by user computing devices 302 while also providing user computing devices 302 with the ability to live browse the content of backup copy 116 and further to implement their own private versions (private writable backup copy) derived therefrom.

ISCSI service module 401 is a functional component that was described in part in FIG. 4. In addition to the features described in FIG. 4, ISCSI service 401 also performs other operations, such as instructing media agent 544 to restore one or more given extents from block level backup copy 116 on backup media 108; creating archive store directory 550; instructing media agent 544 to store each extent restored from block-level backup copy 116 to a unique extent-file 517 (e.g., 517-1 ... 517-7 ... 517-N) stored in archive store directory 550; creating private store directories 560 (e.g., 560-1, 560-2); copying extent-files from archive store directory 550 into a respective private store directory 560 (e.g., extent-files 570, 580); receiving and analyzing read and write requests from user computing devices 302 and serving responses thereto; providing a user interface 1010 to user computing devices 302 for requesting and accessing private writable backup copies; etc. Additionally, features described in regard to FIG. 4 and private writable snapshots also are largely provided by ISCSI service 401 and are described in more detail in FIG. 4.

Media agent 544 is analogous to media agent 144 and further comprises additional functionality for operating in system 300, such as having a communicative coupling with ISCSI service 401, receiving instructions on restoring individual extents of a certain size and storing restored extents as individual extent-files to archive store directory 550, etc. In some alternative embodiments media agent 544 comprises ISCSI service module 401 and is said to provide the ISCSI Service described herein.

Archive store directory 550 is a directory (or folder or equivalent) data structure created on ISCSI server 301 by ISCSI service 401. Directories and folders and equivalent data structures are well known in the art. Archive store directory 550 is first created on a first-time request for a private writable backup copy derived from block-level backup copy 116 when a request is first received from a user computing device 302. If no archive store directory 550 was previously created in reference to the given block-level backup copy 116, ISCSI service 401 creates one here. Its contents are extent-files received from media agent 544 as depicted by the one-way arrow from media agent 544 to archive store directory 550 accompanied by the "EXT" label.

Extent-files 517 (e.g., 517-1 ... 517-7 ... 517-N) are ordinary data files. Each extent-file 517 comprises the data of one unique extent restored by media agent 544 from block-level backup copy 116. Thus, each extent-file 517 uniquely defines and is uniquely associated with the particular extent of data that it comprises. The one-to-one relationship between extent and extent-file 517 enables ISCSI service 401 to determine whether a certain extent is present in archive store directory 550 by checking whether the sought-after extent's corresponding extent-file 517 is present in the archive store directory 550.

Private store directories 560 (e.g., U1 560-1, U2 560-2) are the private environments or workspaces that are directly accessible to user computing devices 302. Thus, a user's private writable backup copy according to the illustrative embodiment is actually implemented as a private store directory 560 as described herein. Like archive store directory 550, private store directory 560 is also a directory (or folder or equivalent) data structure that comprises extent-files (e.g., 570, 580). Illustratively, private store directory U1 560-1 is accessible to user computing device "U1" 302-1; and private store directory U2 560-2 is accessible to user computing device "U2" 302-2. A logical view from the user's perspective is shown in FIG. 10.

According to the illustrative embodiment, a private store directory 560 is created on demand, when ISCSI service 401 receives a request for a private writable backup copy accompanied by and/or comprising a unique identifier (ID) for the private writable backup copy. In response, ISCSI service 401 creates private store directory 560, giving it the unique ID and associating it with archive stored directory 550, which in turn is associated with backup copy 116. This chain of associations is evident from the one-way arrows from backup copy 116 to media agent 544 to archive store directory 550 to private store directories 560-1 and 560-2. Thus, both private store directories 560 are associated with archive store directory 550, and thus derive from the same block-level backup copy 116. Another block-level backup copy 116 would have its own corresponding archive store directory 550, which in turn would be associated with other private store directories 560.

Extent-files 570 (e.g., 570-2, 570-7) are analogous to extent-files 517, but are distinguishable in that the content of an extent-file 570 is created by user computing device 302 (e.g., 302-1). Thus, extent-files 570 represent the private writable aspect of the private writable backup copy here.

Extent-files 580 (e.g., 580-1, 580-2, 580-7) are analogous to extent-files 517, but are distinguishable in that the content of an extent-file 580 is created by user computing device 302 (e.g., 302-2). Thus, extent-files 580 represent the private writable aspect of the private writable backup copy here.

FIG. 6 is a flow chart depicting salient operations in a method 600 that executes in system 300 configured for private writable snapshots as exemplified in FIG. 4. In general, method 600 is performed by ISCSI Server 301, e.g., using ISCSI service 401, except as otherwise noted.

At block 602, accessing ISCSI server's user interface (e.g., 1010) and providing a unique ID to ISCSI server 301, user computing device 302 requests from ISCSI server 301 a private writable snapshot of a data volume, e.g., original volume 420. Thus, user computing device 302 submits a request for a private writable snapshot derived from original volume 420. User computing device 302 provides a unique ID for this private writable snapshot, which ISCSI server 301 (e.g., using ISCSI service 401) will ultimately assign to a private sparse file 430 created on demand in response to this request.

At block 604, which is a decision point, ISCSI server 301 determines whether the request received at block 602 is the first request for a private writable snapshot derived from this version of volume 420. If this is not a first-time request, certain steps are skipped and control passes to block 610. If this is a first-time request, control passes to block 606. Accordingly, ISCSI server 301 tracks versions of data volume 420, to help it determine when a request for a private writable snapshot is "first-time" with respect to that version.

At block 606, ISCSI server 301 generates a snapshot 422 of the desired volume 420. As noted, snapshot 422 is a software snapshot created by ISCSI server 301, e.g., using operating system utilities. Software snapshots are well known in the art. Snapshot 422 is stored on ISCSI server 301. Snapshot 422 is associated with whatever version of data volume 420 it snapshots here.

At block 608, ISCSI server 301 generates a sparse file designated master sparse file 426, which is sized to correspond to and is associated with snapshot 422. ISCSI server 301 also creates a data structure designated master bitmap 428 for tracking block-level activity in master sparse file 426, i.e., for tracking the presence or absence of individual data blocks therein. Master sparse file 426 and master bitmap 428 are both stored on ISCSI server 301.

At block 610, ISCSI server 301 generates a sparse file designated private sparse file 430 (e.g., 430-1) which is identified based on the unique ID received from user computing device 302; private sparse file 430 is associated with master sparse file 426. ISCSI server 301 also creates an associated data structure designated private bitmap 432 (e.g., 432-1) for tracking block-level activity in private sparse file 430, i.e., for tracking the presence or absence of individual data blocks therein. Private sparse file 430 and private bitmap 432 are both stored on ISCSI server 301. Thus, at this point, ISCSI server 301 has created a number of associated data structures.

At block 612, ISCSI server 301 presents private sparse file 430 as a logical unit number ("LUN") to user computing device 302 in response to the request received at block 602.

At block 614, the requesting user computing device 302 mounts private sparse file 430 as a LUN. Mounting a LUN and equivalent techniques are well known in the art.

At block 616, ISCSI server 301 provides a "private writable snapshot" to user computing device 302 in response to the request received at block 602. The private writable snapshot is uniquely identified, such as by the unique ID received at block 602. As noted, the user's private writable snapshot according to the illustrative embodiment is actually implemented as a private sparse file 430. The private writable snapshot is based on private sparse file 430, master sparse file 426, and snapshot 422 as described herein. The private writable snapshot is made accessible to user computing device via ISCSI protocol, which is intercepted and processed by ISCSI service 401. The private writable snapshot is serviced by ISCSI server 301 as described in more detail in FIG. 7

FIG. 7 is a flow chart depicting certain operations in block 616 of method 600. In general, block 616 is directed at ISCSI server 301, e.g., using ISCSI service 401, providing a "private writable snapshot" to user computing device 302 based on private sparse file 430, master sparse file 426, and snapshot 422.

At block 702, ISCSI server 301 receives from user computing device 302 a read request for a given data block (e.g., data block B) in the "writable private snapshot." At this point, user computing device 302 "sees" a private writable snapshot as provided by ISCSI server 301; the private writable snapshot is actually implemented as a private sparse file 430 in association with master sparse file 426 and snapshot 422. Therefore, these latter terms will be used in discussing the operations in the present figure. The read request is intercepted, interpreted, and analyzed by ISCSI server 301, e.g., using ISCSI service 401.

At block 704, ISCSI server 301 checks private bitmap 432 associated with private sparse file 430 to determine whether private bitmap 432 indicates that data block B is present in private sparse file 430. Specifically, a certain bit that tracks data block B is checked here. If the bit indicates that data block B is present in private sparse file 430, control passes to block 712. As shown later, such data blocks are present in private sparse file 430 because at an earlier point in time they were written thereto by user computing device 302. If the bit indicates that private sparse file 430 lacks the sought-after data block B, control passes to block 706.

At block 706, ISCSI server 301 checks master bitmap 428 (associated with master sparse file 426, which is associated with private sparse file 430) to determine whether master bitmap 428 indicates that data block B is present in master sparse file 426. Specifically, a certain bit that tracks data block B is checked here. If the bit indicates that data block B is present in master sparse file 426, control passes to block 710; otherwise control passes to block 708.

At block 708, ISCSI server 301 recalls data block B from snapshot 422 and stores the recalled data block B to master sparse file 426, and updates master bitmap 428 to so indicate. Now master sparse file 426 comprises data block B and master bitmap 428 indicates that data block B is present in master sparse file 426.

At block 710, ISCSI server 301 serves data block B from master sparse file 426 to user computing device 302 in response to the read request received at block 702. In general, data blocks that are unchanged relative to snapshot 422 are served from master sparse file 426 according to the illustrative embodiment. After this read request is served, control passes to another read request at block 702 or to a write request at block 714.

At block 712, ISCSI server 301 serves data block B from private sparse file 430 to user computing device 302 in response to the read request received at block 702. In general, data blocks that are changed by user computing device 302 relative to snapshot 422 are served from private sparse file 430 according to the illustrative embodiment. After this read request is served, control passes to another read request at block 702 or to a write request at block 714.

At block 714, ISCSI server 301 receives a request to write data block B to the "private writable snapshot." This is a submission of new/changed data generated by user computing device 302. The write request is intercepted, interpreted, and analyzed by ISCSI server 301, e.g., using ISCSI service 401.

At block 716, ISCSI server 301 checks private bitmap 432 to determine whether data block B is present in private sparse file 430. Since a data block that is to be written was previously read, the logic in blocks 706 and 708 applies, meaning that the data block was recalled to master sparse file 426 at an earlier point in time. If private bitmap 432 indicates that data block B is not present in private sparse file 430, ISCSI server 301 copies data block B from master sparse file 426 to private sparse file 430 and updates the associated private bitmap 432 to so indicate. Now private sparse file 430 comprises data block B and private bitmap 432 indicates that data block B is present in private sparse file 430.

At block 718, ISCSI server 301 writes data block B to private sparse file 430 by overwriting the corresponding data block copied from master sparse file 426 in the preceding operation. ISCSI server 301 also updates private bitmap 432 to indicate that data block B is present in the private sparse file 430, if not already so updated. As seen in the logic of operations 702-712, future read requests will first check for a sought-after data block in private sparse file 430, since that is where a changed data block might have been written and is thus newer and presumably more relevant than the original data block found in snapshot 422 or master sparse file 426. After this write request is served/effectuated, control passes to another read request at block 702 or to a write request at block 714.

At block 720, ISCSI server 301 also services deletion requests from user computing device 302. When a private sparse file 430 is deleted on a request from user computing device 302, its associated private bitmap 432 also is deleted. However, no changes are implemented to snapshot 422 or master sparse file 426. As a result, any number of other private sparse files 430, associated with one or more user computing devices 302, can continue being serviced by ISCSI server 301 independently of the deleted private sparse file 430. A given user computing device 302 can have any number of private sparse files 430 based on a given master sparse file 426 and snapshot 422. As a result, each "private writable snapshot" is said to operate independently of all the other private writable snapshots as well as independently of any private writable backup copies at ISCSI server 301. This is illustrated in part in FIG. 10.

FIG. 8 is a flow chart depicting salient operations in a method 800 that executes in system 300 configured for private writable backup copies as exemplified in FIG. 5. In general, method 800 is performed by ISCSI server 301, e.g., using ISCSI service 401, except as otherwise noted.

At block 802, accessing ISCSI server's user interface (e.g., 1010) and providing a unique ID to ISCSI server 301, user computing device 302 requests from ISCSI server 301 a private writable backup copy of a block-level backup copy 116, which is illustratively stored on backup media 108. This user computing devoice 302 submits a request for a private writable backup copy derived from backup copy 116. User computing device 302 provides a unique ID for this private writable backup copy, which ISCSI server 301 will ultimately assign to a private store directory 560 created on demand in response to this request.

At block 804, which is a decision point, ISCSI server 301 determines whether the request received at block 802 is the first request for a private writable backup copy derived from this particular backup copy 116. If this is not the first such request, certain steps are skipped and control passes to block 808. This is a first-time request, control passes to block 806.

At block 806, ISCSI server 301 creates a directory (or folder or equivalent) which it designates archive store directory 550 and which corresponds to and is associated with block level backup copy 116. Archive store directory 550 will store extent-files 517 restored from backup copy 116 by media agent 544.

At block 808, ISCSI server 301 creates a directory (or folder or equivalent) which it designates a private store directory 560 and which is identified based on the unique ID received from user computing device 302; private store directory 560 is associated with archive store directory 550. Private store directory 560 will store extent-files (e.g., 570, 580) that are written thereto by user computing device 302. Thus, at this point, ISCSI server 301 has created a number of associated directories.

At block 810, ISCSI server 301 presents private store directory 560 as a logical unit number ("LUN") to the user computing device 302 in response to the request received at block 802.

At block 812, the requesting user computing device 302 mounts private store directory 560 as a LUN. Mounting a LUN and equivalent techniques are well known in the art.

At block 814, ISCSI server 301 provides a "private writable backup copy" to user computing device 302 in response to the request received at block 802. The private writable backup copy is uniquely identified, such as by the unique ID received at block 802. As noted, a user's private writable backup copy according to the illustrative embodiment is actually implemented as a private store directory 560. The private writable backup copy is based on private store directory 560, archive store directory 550, and block-level backup copy 116, as described herein. The private writable backup copy is made accessible to user computing device 302 via ISCSI protocol, which is intercepted and processed by ISCSI service 401 illustratively. The private writable backup copy is serviced by ISCSI server 301 as described in more detail in FIG. 9.

FIG. 9 is a flow chart depicting certain operations in block 814 of method 800. In general, block 814 is directed at ISCSI server 301, e.g., using ISCSI service 401 and media agent 544, providing a "private writable backup copy" to user computing device 302 based on private store directory 560, archive store directory 550, and block-level backup copy 116.

At block 902, ISCSI server 301 receives from user computing device 302 a read request for a given extent (e.g., extent E) in the "private writable backup copy." At this point, user computing device 302 "sees" a private writable backup copy as provided by ISCSI server 301; as explained earlier, the private writable backup copy is actually implemented as a private store directory 560 in association with archive store directory 550 and block-level backup copy 116. Therefore, these latter terms will be used in describing the operations in the present figure. The read request is intercepted, interpreted, and analyzed by ISCSI server 301, e.g., using ISCSI logic 401.

At block 904, which is a decision point, ISCSI server 301 determines whether private store directory 560 comprises an extent-file 570 (or 580, as appropriate in another directory 560) for extent E. This is accomplished by checking whether an extent-file corresponding to extent E is present in private store directory 560, and if so, control passes to block 912; otherwise control passes to block 906. As shown later, data blocks 570 (or 580) are present in private store directory 560 because at an earlier time they were written thereto by user computing device 302.

At block 906, which is a decision point, ISCSI server 301 determines whether archive store directory 550 comprises an extent-file 517 for extent E. This is accomplished by checking whether an extent-file corresponding to extent E is present in archive store directory 550, and if so, control passes to block 910; otherwise control passes to block 908.

At block 908, ISCSI server 301 instructs media agent 544 to restore extent E from block-level backup copy 116 on backup media 108 and to store the restored extent to an extent-file 517 (e.g., designated extent-file E corresponding to extent E) in archive store directory 550. Media agent 544 executes the restore operation as instructed, restoring the extent from a backup format in backup copy 116 to a native block format suitable for browsing by user computing device 302, and stores extent-file E to archive store directory 550 as instructed.

At block 910, ISCSI server 301 serves extent E from extent-file E in archive store directory 550 to user computing device 302 in response to the read request received at block 902. In general, extents that are unchanged relative to the block-level backup copy 116 are served from archive store directory 550 according to the illustrative embodiment.

After this read request is served, control passes to another read request at block 902 or to a write request at block 914.

At block 912, ISCSI server 301 serves extent E from extent-file E in private store directory 560 to user computing device 302 in response to the read request received at block 902. In general, extents that are changed by user computing device 302 relative to block-level backup copy 116 are served from private store directory 560 according to the illustrative embodiment. After this read request is served, control passes to another read request at block 902 or to a write request at block 914.

At block 914, ISCSI server 301 receives a request to write extent E to the "private writable backup copy." This is a submission of new/changed data generated by user computing device 302. The write request is intercepted, interpreted, and analyzed by ISCSI server 301, e.g., using ISCSI service 401.

At block 916, ISCSI server 301 determines whether extent-file E is present in private store directory 560. Since an extent that is to be written was previously read, the logic in operations 906-908 applies, meaning that the extent was restored to archive store directory 550 at an earlier time. If private store directory 560 does not comprise an extent-file E, ISCSI server 301 copies extent-file E from archive store directory 550 to private store directory 560.

At block 918, ISCSI server 301 writes extent E as received from user computing device 302 to extent-file E in private store directory 560 by overwriting the corresponding extent-file E copied from archive store directory 550 in the preceding operation. As seen in the logic of operations 902-912, future read requests will first check for a sought-after extent in private store directory 560, since that is where a changed extent might have been written and is thus newer and presumably more relevant than the original extent found in backup copy 116 or restored to archive store directory 550. After this write request is served/effectuated, control passes to a read request at block 902 or to another write request at block 914.

At block 920, ISCSI server 301 also services deletion requests from user computing device 302. When a "private writable backup copy" is deleted, the private store directory 560 is deleted at ISCSI server 301. However, no changes are implemented at archive store directory 550 or block-level backup copy 116. Any number of other private store directories 560, associated with one or more user computing devices 302, including possibly associated with the present user computing device 302, continue to be serviced by ISCSI server 301 independently of the deleted private store directory 560. A given user computing device 302 can have any number of private store directories 560 based on a given archive store directory 550 and block-level backup copy 116. As a result, each "private writable backup copy" is said to operate independently of all other private writable backup copies as well as independently of any private writable snapshots at ISCSI server 301. This is illustrated in part in FIG. 10.

FIG. 10 is a block diagram depicting a user's logical view of system 300 configured for private writable backup copy and private writable snapshot. The configurations of system 300 according to FIG. 4 (private writable snapshots) and FIG. 5 (private writable backup copies) are mutually compatible, and therefore any given user computing device 302 can have any number of private writable snapshots 430 and/or any number of private writable backup copies 560. FIG. 10 depicts: block level backup copy 116; ISCSI server 301 comprising ISCSI service 401 comprising user interface 1010, original volume 420, private writable snapshots 430 (e.g., 430-1, 430-2) and private writable backup copies 560 (e.g., 560-1, 560-2); and user computing device 302 (e.g., 302-1, 302-2) in communication with ISCSI server 301. Since this figure depicts a logical view perceived by a user of a user computing device 302, several of the underlying data structures and other functional components are not visible to said user and are not shown here. Rather, a given user perceives a private writable snapshot 430 based on an original volume 420 (dotted one-way arrows) and mounted as a LUN to the user's user computing device 302 (solid two-way arrows); likewise, the given user perceives a private writable backup copy 560 based on block-level backup copy 116 (dashed one-way arrows) and mounted as a LUN to the user's user computing device 302 (solid two-way arrows). There is no limit on: the number of block-level backup copies 116 and/or the respective backup media on which they reside; the number of distinct source volumes 420; the number of distinct snapshots 422 taken from a given source volume 420; the number of private writable snapshots 430; and the number of private writable backup copies 560. In some alternative embodiments user interface 1010 is implemented separately from ISCSI service 401.

The user of a given user computing device 302 interacts with ISCSI server 301 via an illustrative user interface 1010 (solid two-way arrows labeled "UI"), which is illustratively part of ISCSI service 401 executing on ISCSI server 301. Accordingly, via user interface 1010, a user views sources available for private writable workspaces, such as one or more original volume 420 and/or one or more block-level backup copy 116, and requests a corresponding private writable workspace based on the source, e.g., one or more private writable snapshots 430, one or more private writable backup copies 560. Moreover, via user interface 1010 ISCSI service 401 also provides the user the ability to live browse source data without having to actually write new/changed data to the corresponding private writable workspace, as explained in more detail in preceding figures herein. See also blocks 702-710 in FIG. 7 and blocks 902-910 in FIG. 9.

In alternative embodiments, user interface 1010 further shows the user a plurality of snapshots 422 as distinct point-in-time copies of original source volume 420 (see, e.g., FIG. 4) and gives the user a choice of choosing a certain snapshot 422 as the source for the corresponding private writable snapshot 430. User interface 1010 further gives the user a choice of choosing the same snapshot 422 or another snapshot 422 as the source for another corresponding private writable snapshot without limitation. Each private writable snapshot 430 will operate independently of the others even when based on or derived from the same source snapshot 422 and/or the same source volume 420.

User interface 1010 further gives the user a choice of choosing from any number of block-level backup copies 116 stored on one or more distinct backup media. Furthermore, user interface 1010 further gives the user a choice of choosing the same block-level copy 116 multiple times for distinct respective private writable backup copies 560, each of which will operate independently of the others, even though they are all based on or derived from the same block-level backup copy 116.

In regard to the figures described herein, other embodiments are possible within the scope of the present invention, such that the above-recited components, steps, blocks, operations, messages, requests, queries, and/or instructions are differently arranged sequenced, sub-divided, organized, and/or combined. In some embodiments, a different component may initiate or execute a given operation. For example, in some embodiments, a storage manager comprises the functionality of ISCSI server 301 described herein.

EXAMPLE EMBODIMENTS

Some example enumerated embodiments of the present invention are recited in this section in the form of methods, systems, and non-transitory computer-readable media, without limitation.

According to an embodiment of the present invention, a system for providing private writable snapshots to user computing devices, the system comprising: a first computing device comprising an Internet Small Computer Systems Interface (ISCSI) service; a second computing device in communication with the first computing device via ISCSI protocol; and wherein the first computing device using the ISCSI service is configured to: receive from the second computing device a first unique ID and a first request for a first private writable snapshot of a first volume, if the first request is the first time system-wide that a private writable snapshot has been requested for the first volume, generate a first snapshot of the first volume, from the first snapshot, generate a sparse file designated a master sparse file which corresponds to the snapshot, generate a master bitmap associated with the master sparse file, wherein the master bitmap tracks block-level activity in the master sparse file, from the master sparse file, generate a private sparse file having the first unique ID, generate a private bitmap associated with the private sparse file, wherein the private bitmap tracks block-level activity in the private sparse file, present the private sparse file as a logical unit number (LUN) to the second computing device; and wherein the second computing device is configured to mount the LUN, thereby acquiring access to the private sparse file, which is based on the first snapshot and the master sparse file, and incorporates changes generated by the second computing device that are written to the private sparse file without changing the first snapshot, thereby operating as the first private writable snapshot requested by the second computing device.

The above-recited system wherein the first computing device is further configured to store the first snapshot, the master sparse file, and the private sparse file. The above-recited system wherein the second computing device has access to the private writable snapshot as provided by the ISCSI service on the first computing device, without a pseudo-disk driver installed on the second computing device. The above-recited system wherein the master bitmap tracks which data blocks are present in the master sparse file, including data blocks copied therein from the first snapshot; and wherein the private bitmap tracks which data blocks are present in the private sparse file, including data blocks copied therein from the master sparse file and data blocks written therein by the second computing device. The above-recited system wherein the first computing device is further configured to: receive from the second computing device a first read request for a first data block in the LUN, check the private bitmap to determine whether the first data block is in the private sparse file, and if the private bitmap so indicates, serve the first data block from the private sparse file to the second computing device in response to the first read request, if the private bitmap indicates that the first data block is not in the private sparse file, check the master bitmap to determine whether the first data block is in the master sparse file, and if the master bitmap so indicates, serve the first data block from the master sparse file to the second computing device in response to the first read request. The above-recited system further comprising: if the private bitmap indicates that the first data block is not in the private sparse file and the master bitmap indicates that the first data block is not in the master sparse file, copy the first data block from the first snapshot to the master sparse file and update the master bitmap to indicate that the first data block is in the master sparse file. The above-recited system wherein the first computing device is further configured to: receive from the second computing device a first write request to write a first data block to the LUN, check the private bitmap to determine whether the private sparse file comprises a corresponding data block, and if the private bitmap so indicates, write the first data block as received from the second computing device to the private sparse file, thereby overwriting the corresponding data block. The above-recited system further comprising: if the private bitmap indicates that the private sparse file lacks the corresponding data block, check the master bitmap to determine whether the master sparse file comprises the corresponding data block, and if the private bitmap so indicates, copy the corresponding data block from the master sparse file to the private sparse file and update the private bitmap to indicate that the private sparse file comprises the corresponding data block. The above-recited system wherein the first computing device is further configured to: receive from the second computing device a request to delete the private sparse file, and delete the private sparse file and the private bitmap associated therewith without changing or deleting the master sparse file, the master bitmap, or the first snapshot. The above-recited system wherein the private sparse file operates as a private writable snapshot for the second computing device without changing the first snapshot. The above-recited system wherein the second computing device is configured to, by mounting the LUN, access the private sparse file for browsing data blocks obtained from the first volume and further for implementing changes to the data blocks obtained from the first volume without changing the first snapshot. The above-recited system further comprising: a third computing device in communication with the first computing device via ISCSI protocol; and wherein the first computing device using the ISCSI service is further configured to: receive from the third computing device a second unique ID and a second request for a second private writable snapshot of the first volume, from the master sparse file, generate a second private sparse file having the second unique ID, generate a second private bitmap associated with the second private sparse file, wherein the second private bitmap tracks block-level activity in the second private sparse file, present the second private sparse file as a second logical unit number (LUN) to the third computing device; and wherein the third computing device is configured to mount the second LUN, thereby acquiring access to the second private sparse file, which is based on the first snapshot and the master sparse file, and incorporates changes generated by the third computing device that are written to the second private sparse file without changing the first snapshot or the first private writable snapshot, and thereby operating as the second private writable snapshot, which is independent of the first private writable snapshot. The above-recited system wherein any number of second private writable snapshots are created with respect to any number of third computing devices and operate independently of each other and independently of the first private writable snapshot. The above-recited system wherein the first computing device using the ISCSI service is further configured to: receive from the second computing device a second unique ID and a second request for a second private writable snapshot of the first volume, from the master sparse file, generate a second private sparse file having the second unique ID, generate a second private bitmap associated with the second private sparse file, wherein the second private bitmap tracks block-level activity in the second private sparse file, present the second private sparse file as a second logical unit number (LUN) to the second computing device; and wherein the second computing device is configured to mount the second LUN, thereby acquiring access to the second private sparse file, which is based on the first snapshot and the master sparse file, and incorporates changes generated by the second computing device that are written to the second private sparse file without changing the first snapshot or the first private writable snapshot, and thereby operating as the second private writable snapshot, which is independent of the first private writable snapshot. The above-recited system wherein any number of second private writable snapshots are created and operate independently of each other and independently of the first private writable snapshot.

According to another embodiment, a system for providing private writable snapshots to user computing devices, the system comprising: a first computing device comprising an Internet Small Computer Systems Interface (ISCSI) service; a second computing device in communication with the first computing device via ISCSI protocol; and wherein the first computing device using the ISCSI service is configured to: receive from the second computing device a first unique ID and a first request for a first private writable snapshot of a first volume, if a first snapshot of the first volume was not previously created, generate a first snapshot of the first volume, from the first snapshot, generate a sparse file designated a master sparse file which corresponds to the snapshot, from the master sparse file, generate a private sparse file having the first unique ID, present the private sparse file as a logical unit number (LUN) to the second computing device; and wherein the second computing device is configured to, by mounting the LUN, access the private sparse file for browsing data blocks obtained from the first volume and further for implementing changes to the data blocks obtained from the first volume without changing the first snapshot.

The above-recited system wherein the first computing device is further configured to: generate a master bitmap associated with the master sparse file, wherein the master bitmap tracks which data blocks are present in the master sparse file, and generate a private bitmap associated with the private sparse file, wherein the private bitmap tracks which data blocks are present in the private sparse file. The above-recited system wherein the first computing device is further configured to: generate a master bitmap associated with the master sparse file, wherein the master bitmap tracks which data blocks are present in the master sparse file, including data blocks copied therein from the first snapshot, and generate a private bitmap associated with the private sparse file, wherein the private bitmap tracks which data blocks are present in the private sparse file, including data blocks copied therein from the master sparse file and data blocks written therein by the second computing device. The above-recited system wherein the first computing device is further configured to store the first snapshot, the master sparse file, and the private sparse file. The above-recited system wherein the first computing device is further configured to: receive from the second computing device a first read request for a first data block in the LUN, check a private bitmap associated with the private sparse file to determine whether the first data block is present in the private sparse file, and if the private bitmap so indicates, serve the first data block from the private sparse file to the second computing device in response to the first read request, if the private bitmap indicates that the first data block is not present in the private sparse file, check a master bitmap associated with the master sparse file to determine whether the first data block is present in the master sparse file, and if the master bitmap so indicates, serve the first data block from the master sparse file to the second computing device in response to the first read request. The above-recited system further comprising: if the private bitmap indicates that the first data block is not present in the private sparse file and the master bitmap indicates that the first data block is not present in the master sparse file, copy the first data block from the first snapshot to the master sparse file and update the master bitmap to indicate that the first data block is present in the master sparse file. The above-recited system wherein the first computing device is further configured to: receive from the second computing device a first write request to write a first data block to the LUN, check a private bitmap associated with the private sparse file to determine whether the private sparse file comprises a corresponding data block, and if the private bitmap so indicates, write the first data block as received from the second computing device to the private sparse file, thereby overwriting the corresponding data block, and if the private bitmap indicates that the private sparse file lacks the corresponding data block, check a master bitmap associated with the master sparse file to determine whether the master sparse file comprises the corresponding data block, and if the private bitmap so indicates, copy the corresponding data block from the master sparse file to the private sparse file and update the private bitmap to indicate that the private sparse file comprises the corresponding data block. The above-recited system wherein the private sparse file is based on the first snapshot and the master sparse file, and incorporates changes generated by the second computing device that are written to the private sparse file without changing the first snapshot, thereby becoming a private writable snapshot.

According to yet another illustrative embodiment, a method for providing private writable snapshots to user computing devices, the method comprising: receiving, by a first computing device that executes an Internet Small Computer Systems Interface (ISCSI) service, from a second computing device in communication with the first computing device via ISCSI protocol, a first unique ID and a first request for a first private writable snapshot of a first volume; if a first snapshot of the first volume was not previously created, generating by the first computing device a first snapshot of the first volume; from the first snapshot, generating by the first computing device a sparse file designated a master sparse file which corresponds to the first snapshot; from the master sparse file, generating by the first computing device a private sparse file having the first unique ID received from the second computing device; presenting by the first computing device the private sparse file as a logical unit number (LUN) to the second computing device; and mounting the LUN by the second computing device, thereby acquiring access to the private sparse file for browsing data blocks obtained from the first volume and further for implementing changes to the data blocks obtained from the first volume without changing the first snapshot, and wherein the private sparse file is based on the first snapshot and the master sparse file, and incorporates changes generated by the second computing device that are written to the private sparse file, thereby becoming a private writable snapshot.

The above-recited method further comprising: generating by the first computing device a master bitmap associated with the master sparse file, wherein the master bitmap tracks which data blocks are present in the master sparse file, and generating by the first computing device a private bitmap associated with the private sparse file, wherein the private bitmap tracks which data blocks are present in the private sparse file. The above-recited method further comprising: generating by the first computing device a master bitmap associated with the master sparse file, wherein the master bitmap tracks which data blocks are present in the master sparse file, including data blocks copied therein from the first snapshot, and generating by the first computing device a private bitmap associated with the private sparse file, wherein the private bitmap tracks which data blocks are present in the private sparse file, including data blocks copied therein from the master sparse file and data blocks written therein by the second computing device. The above-recited method wherein the first computing device stores the first snapshot, the master sparse file, and the private sparse file. The above-recited method further comprising: receiving by the first computing device from the second computing device a first read request for a first data block in the LUN, checking by the first computing device a private bitmap associated with the private sparse file to determine whether the first data block is present in the private sparse file, and if the private bitmap so indicates, serving the first data block from the private sparse file to the second computing device in response to the first read request, if the private bitmap indicates that the first data block is not present in the private sparse file, checking by the first computing device a master bitmap associated with the master sparse file to determine whether the first data block is present in the master sparse file, and if the master bitmap so indicates, serving the first data block from the master sparse file to the second computing device in response to the first read request. The above-recited method further comprising: if the private bitmap indicates that the first data block is not present in the private sparse file and the master bitmap indicates that the first data block is not present in the master sparse file, copying by the first computing device the first data block from the first snapshot to the master sparse file and update the master bitmap to indicate that the first data block is present in the master sparse file. The above-recited method further comprising: receiving by the first computing device from the second computing device a first write request to write a first data block to the LUN; checking by the first computing device a private bitmap associated with the private sparse file to determine whether the private sparse file comprises a corresponding data block, and if the private bitmap so indicates, writing the first data block as received from the second computing device to the private sparse file, thereby overwriting the corresponding data block, and if the private bitmap indicates that the private sparse file lacks the corresponding data block, checking a master bitmap associated with the master sparse file to determine whether the master sparse file comprises the corresponding data block, and if the private bitmap so indicates, copying the corresponding data block from the master sparse file to the private sparse file and updating the private bitmap to indicate that the private sparse file comprises the corresponding data block.

According to one more illustrative embodiment, a computer-readable medium, excluding transitory propagating signals, storing instructions that, when executed by at least one computing device comprising one or more processors and computer memory, cause the computing device to perform operations comprising: receiving from a second computing device via ISCSI protocol, a first unique ID and a first request for a first private writable snapshot of a first volume; if a first snapshot of the first volume was not previously created, generating a first snapshot of the first volume; from the first snapshot, generating a sparse file designated a master sparse file which corresponds to the first snapshot; from the master sparse file, generating a private sparse file having the first unique ID received from the second computing device; presenting by the first computing device the private sparse file as a logical unit number (LUN) to the second computing device, to be mounted thereby as a LUN, thereby granting the first computing access to the private sparse file as the first private writable snapshot. The above-recited computer-readable medium wherein the operations further comprise: receiving from the second computing device a first read request for a first data block in the LUN; checking a private bitmap associated with the private sparse file to determine whether the first data block is present in the private sparse file, and if the private bitmap so indicates, serving the first data block from the private sparse file to the second computing device in response to the first read request; if the private bitmap indicates that the first data block is not present in the private sparse file, checking a master bitmap associated with the master sparse file to determine whether the first data block is present in the master sparse file, and if the master bitmap so indicates, serving the first data block from the master sparse file to the second computing device in response to the first read request. The above-recited computer-readable medium wherein if the private bitmap indicates that the first data block is not present in the private sparse file and the master bitmap indicates that the first data block is not present in the master sparse file, copying the first data block from the first snapshot to the master sparse file and updating the master bitmap to indicate that the first data block is present in the master sparse file. The above-recited computer-readable medium wherein the operations further comprise: receiving from the second computing device a first write request to write a first data block to the LUN; checking a private bitmap associated with the private sparse file to determine whether the private sparse file comprises a corresponding data block, and if the private bitmap so indicates, writing the first data block as received from the second computing device to the private sparse file, thereby overwriting the corresponding data block, and if the private bitmap indicates that the private sparse file lacks the corresponding data block, checking a master bitmap associated with the master sparse file to determine whether the master sparse file comprises the corresponding data block, and if the private bitmap so indicates, copying the corresponding data block from the master sparse file to the private sparse file and updating the private bitmap to indicate that the private sparse file comprises the corresponding data block.

According to an example embodiment of the present invention a system for providing private writable backup copies to user computing devices, the system comprising: a first computing device comprising an Internet Small Computer Systems Interface (ISCSI) service; a data storage device in communication with the first computing device and comprising a block-level backup copy of data; a second computing device in communication with the first computing device via ISCSI protocol; and wherein the first computing device using the ISCSI service is configured to: receive from the second computing device a first unique ID and a first request for a first private writable backup copy of the block-level backup copy of data, if the first request is the first time system-wide that a private writable backup copy has been requested for the block-level backup copy of data, generate a first directory designated an archive store which corresponds to the block-level backup copy of data, generate a second directory designated a private store having the first unique ID, present the private store directory as a logical unit number (LUN) to the second computing device; and wherein the second computing device is configured to mount the LUN, thereby acquiring access to the private store, which is based on the archive store and the block-level backup copy of data, and incorporates changes generated by the second computing device that are written to the private store without changing the block-level backup copy of data, thereby operating as the first private writable backup copy requested by the second computing device.

The above-recited system wherein the first computing device is further configured to store the archive store and the private store and to serve data therefrom to the second computing device. The above-recited system wherein the first computing device is further configured to: receive from the second computing device a first read request for a first data extent in the LUN, check the private store to determine whether the first data extent is represented by a first extent-file in the private store, and if so, serve the first data extent from the first extent-file in the private store to the second computing device in response to the first read request, if the private store lacks the first extent-file, check to determine whether the first extent-file is present in the archive store, and if so, serve the first data extent from the first extent-file in the archive store to the second computing device in response to the first read request. The above-recited system further comprising: if the private store lacks the first extent-file and the archive store also lacks the first extent-file, restoring the first data extent from the block-level backup copy of data in the storage device to a corresponding extent-file stored to the archive store, wherein the restoring is performed by a media agent that also executes on the first computing device. The above-recited system wherein the first computing device is further configured to: receive from the second computing device a first write request to write a first data extent to the LUN, check whether the private store comprises a corresponding extent-file for the first data extent, and if so, write the first data extent as received from the second computing device to the private store, thereby overwriting the corresponding extent-file, and if the private store lacks the corresponding extent-file for the first data extent, check whether the archive store comprises the corresponding extent-file, and if so, copy the corresponding extent-file from the archive store to the private store. The above-recited system wherein the first computing device is further configured to: receive from the second computing device a request to delete the private writable backup copy, and in response, delete the private store without changing or deleting the archive store, and further without changing the block-level backup copy of data. The above-recited system wherein the second computing device is configured to, by mounting the LUN, access the private store for browsing data extents obtained from the block-level backup copy of data and further for implementing changes to the data extents obtained from the block-level backup copy of data without changing the block-level backup copy of data. The above-recited system further comprising: a third computing device in communication with the first computing device via ISCSI protocol; and wherein the first computing device using the ISCSI service is further configured to: receive from the third computing device a second unique ID and a second request for a second private writable backup copy of the block-level backup copy of data, generate a second private store having the second unique ID, present the second private store as a second logical unit number (LUN) to the third computing device; and wherein the third computing device is configured to mount the second LUN, thereby acquiring access to the second private store, which is based on the archive store and the block-level backup copy of data, and incorporates changes generated by the third computing device that are written to the second private store without changing the block-level backup copy of data, thereby operating as the second private writable backup copy requested by the third computing device. The above-recited system wherein any number of second private writable backup copies are created with respect to any number of third computing devices and operate independently of each other and independently of the first private writable backup copy. The above-recited system wherein the first computing device using the ISCSI service is further configured to: receive from the second computing device a second unique ID and a second request for a second private writable backup copy of the block-level backup copy of data, generate a second private store having the second unique ID, present the second private store as a second logical unit number (LUN) to the second computing device; and wherein the second computing device is configured to mount the LUN, thereby acquiring access to the second private store, which is based on the archive store and the block-level backup copy of data, and incorporates changes generated by the second computing device that are written to the second private store without changing the block-level backup copy of data, thereby operating as the second private writable backup copy requested by the second computing device, and independent of the first private writable backup copy of data also accessed by the second computing device. The above-recited system wherein any number of second private writable backup copies are created and operate independently of each other and independently of the first private writable backup copy.

According to another example embodiment a system for providing private writable backup copies to user computing devices, the system comprising: a first computing device comprising an Internet Small Computer Systems Interface (ISCSI) service; a second computing device in communication with the first computing device via ISCSI protocol; and wherein the first computing device using the ISCSI service is configured to: receive from the second computing device a first unique ID and a first request for a first private writable backup copy of a block-level backup copy of data, which is stored on a data storage device in communication with the first computing device, if an archive store directory corresponding to the block-level backup copy of data was not previously created at the first computing device, generate the archive store directory corresponding to the block-level backup copy of data, generate a private store directory having the first unique ID, present the private store directory as a logical unit number (LUN) to the second computing device; and wherein the second computing device is configured to, by mounting the LUN, access the private store directory as the request first private writable backup copy for browsing data extents restored from the block-level backup copy of data and further for implementing changes to the data extents restored from the block-level backup copy of data without changing the block-level backup copy of data. The above-recited system wherein the archive store directory stored extent-files that represent corresponding data extents restored from the block-level backup copy by a media agent that also executes on the first computing device.

The above-recited system wherein the archive store directory stored extent-files that represent corresponding data extents restored from the block-level backup copy by a media agent that also executes on the first computing device; and wherein the private store receives extent-files from the archive store when the second computing device submits a write request for a data extent that lacks a corresponding extent-file in the private store directory. The above-recited system wherein the first computing device is further configured to store the archive store directory and the private store directory. The above-recited system wherein the first computing device is further configured to: receive from the second computing device a first read request for a first data extent in the LUN, check the private store to determine whether the first data extent is represented by a first extent-file in the private store, and if so, serve the first data extent from the first extent-file in the private store to the second computing device in response to the first read request, if the private store lacks the first extent-file, check to determine whether the first extent-file is present in the archive store, and if so, serve the first data extent from the first extent-file in the archive store to the second computing device in response to the first read request. The above-recited system further comprising: if the private store lacks the first extent-file and the archive store also lacks the first extent-file, restoring the first data extent from the block-level backup copy of data in the storage device to a corresponding extent-file stored to the archive store, wherein the restoring is performed by a media agent that also executes on the first computing device. The above-recited system wherein the first computing device is further configured to: receive from the second computing device a first write request to write a first data extent to the LUN, check whether the private store comprises a corresponding extent-file for the first data extent, and if so, write the first data extent as received from the second computing device to the private store, thereby overwriting the corresponding extent-file, and if the private store lacks the corresponding extent-file for the first data extent, check whether the archive store comprises the corresponding extent-file, and if so, copy the corresponding extent-file from the archive store to the private store. The above-recited system wherein the first computing device is further configured to: receive from the second computing device a request to delete the private writable backup copy, and in response, delete the private store without changing or deleting the archive store, and further without changing the block-level backup copy of data. The above-recited system wherein the second computing device is configured to, by mounting the LUN, access the private store for browsing data extents obtained from the block-level backup copy of data and further for implementing changes to the data extents obtained from the block-level backup copy of data without changing the block-level backup copy of data. The above-recited system further comprising: a third computing device in communication with the first computing device via ISCSI protocol; and wherein the first computing device using the ISCSI service is further configured to: receive from the third computing device a second unique ID and a second request for a second private writable backup copy of the block-level backup copy of data, generate a second private store having the second unique ID, present the second private store as a second logical unit number (LUN) to the third computing device; and wherein the third computing device is configured to mount the second LUN, thereby acquiring access to the second private store, which is based on the archive store and the block-level backup copy of data, and incorporates changes generated by the third computing device that are written to the second private store without changing the block-level backup copy of data, thereby operating as the second private writable backup copy requested by the third computing device. The above-recited system wherein any number of second private writable backup copies are created with respect to any number of third computing devices and operate independently of each other and independently of the first private writable backup copy. The above-recited system further comprising: wherein the first computing device using the ISCSI service is further configured to: receive from the second computing device a second unique ID and a second request for a second private writable backup copy of the block-level backup copy of data, generate a second private store having the second unique ID, present the second private store as a second logical unit number (LUN) to the second computing device; and wherein the second computing device is configured to mount the LUN, thereby acquiring access to the second private store, which is based on the archive store and the block-level backup copy of data, and incorporates changes generated by the second computing device that are written to the second private store without changing the block-level backup copy of data, thereby operating as the second private writable backup copy requested by the second computing device, and independent of the first private writable backup copy of data also accessed by the second computing device. The above-recited system wherein any number of second private writable backup copies are created and operate independently of each other and independently of the first private writable backup copy.

According to yet another example embodiment, a method for providing private writable backup copies to user computing devices, the method comprising: receiving, by a first computing device that executes an Internet Small Computer Systems Interface (ISCSI) service and a media agent in communication with a data storage device, from a second computing device in communication with the first computing device via ISCSI protocol, a first unique ID and a first request for a first private writable backup copy of a block-level backup copy of data in the data storage device; if an archive store directory corresponding to the block-level backup copy of data was not previously created, generating by the first computing device the archive store directory corresponding to the block-level backup copy of data; generating by the first computing device a private store directory having the first unique ID received from the second computing device; presenting by the first computing device the private sparse file as a logical unit number (LUN) to the second computing device; and mounting the LUN by the second computing device, thereby acquiring access to the private store directory operating as the requested private writable backup copy for browsing data extents obtained from the block-level backup copy of data and further for implementing changes to the data extents obtained from the block-level backup copy of data without changing the block-level backup copy of data, and wherein the private store directory is based on the archive store directory, and incorporates changes generated by the second computing device.

The above-recited method wherein the first computing device stores the archive store directory and the private store directory. The above-recited method further comprising: receiving by the first computing device from the second computing device a first read request for a first data extent in the LUN, checking by the first computing device whether the first data extent is represented by a first extent-file in the private store directory, and if so, serving the first data extent from the first extent-file in the private store directory to the second computing device in response to the first read request, if the private bitmap indicates that the first extent-file is not present in the private store directory, checking by the first computing device whether the first extent-file is present in the archive store directory, and if so, serving the first data extent from the first extent-file in the archive store directory to the second computing device in response to the first read request. The above-recited method further comprising: if the first extent-file is not present in the private store directory and is also not present in the archive store directory, restoring by the media agent executing on the first computing device the first data extent from the first snapshot to the first extent-file stored to the archive store directory. The above-recited method further comprising: receiving by the first computing device from the second computing device a first write request to write a first data extent to the LUN; checking by the first computing device whether the private store comprises a corresponding extent-file for the first data extent, and if so, write the first data extent as received from the second computing device to the private store, thereby overwriting the corresponding extent-file, and if the private store lacks the corresponding extent-file for the first data extent, check whether the archive store comprises the corresponding extent-file, and if so, copy the corresponding extent-file from the archive store to the private store.

According to one more example embodiment, a computer-readable medium, excluding transitory propagating signals, storing instructions that, when executed by at least one computing device comprising one or more processors and computer memory, cause the computing device to perform operations comprising: Executing an Internet Small Computer Systems Interface (ISCSI) service and a media agent in communication with a data storage device, Receiving from a second computing device in communication with the first computing device via ISCSI protocol, a first unique ID and a first request for a first private writable backup copy of a block-level backup copy of data stored in a data storage device in communication with the media agent; if an archive store directory corresponding to the block-level backup copy of data was not previously created, generating the archive store directory corresponding to the block-level backup copy of data; generating a private store directory having the first unique ID received from the second computing device; presenting the private sparse file as a logical unit number (LUN) to the second computing device, thereby granting the second computing device access to the private store directory operating as the requested private writable backup copy for browsing data extents obtained from the block-level backup copy of data and further for implementing changes to the data extents obtained from the block-level backup copy of data without changing the block-level backup copy of data, and wherein the private store directory is based on the archive store directory, and incorporates changes generated by the second computing device. The above-recited computer-readable wherein the first computing device stores the archive store directory and the private store directory. The above-recited computer-readable media wherein the operations further comprise: receiving from the second computing device a first read request for a first data extent in the LUN, checking whether the first data extent is represented by a first extent-file in the private store directory, and if so, serving the first data extent from the first extent-file in the private store directory to the second computing device in response to the first read request, if the private bitmap indicates that the first extent-file is not present in the private store directory, checking whether the first extent-file is present in the archive store directory, and if so, serving the first data extent from the first extent-file in the archive store directory to the second computing device in response to the first read request. The above-recited computer-readable media further comprising: if the first extent-file is not present in the private store directory and is also not present in the archive store directory, restoring by the media agent executing on the first computing device the first data extent from the first snapshot to the first extent-file stored to the archive store directory. The above-recited computer-readable media wherein the operations further comprise: receiving from the second computing device a first write request to write a first data extent to the LUN; checking whether the private store comprises a corresponding extent-file for the first data extent, and if so, write the first data extent as received from the second computing device to the private store, thereby overwriting the corresponding extent-file, and if the private store lacks the corresponding extent-file for the first data extent, checking whether the archive store comprises the corresponding extent-file, and if so, copying the corresponding extent-file from the archive store to the private store, thereby causing the requested private writable backup copy to differ from the block-level backup copy of data upon which the private writable backup copy is based.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A system for providing private writable snapshots to user computing devices, the system comprising:
a first computing device comprising an Internet Small Computer Systems Interface (ISCSI) service;
a second computing device in communication with the first computing device via ISCSI protocol; and
wherein the first computing device using the ISCSI service is configured to:
receive from the second computing device a first unique identifier and a first request for a first private writable snapshot of a first volume, if a first snapshot of the first volume was not previously created, generate a first snapshot of the first volume, from the first snapshot, generate a sparse file designated a master sparse file which corresponds to the first snapshot, from the master sparse file, generate a private sparse file having the first unique identifier, present the private sparse file as a logical unit number (LUN) to the second computing device; and wherein the second computing device is configured to, by mounting the LUN, access the private sparse file for browsing data blocks obtained from the first volume and further for implementing changes to the data blocks obtained from the first volume without changing the first snapshot.

2. The system of claim 1 wherein the first computing device is further configured to:

generate a master bitmap associated with the master sparse file, wherein the master bitmap tracks which data blocks are present in the master sparse file, and generate a private bitmap associated with the private sparse file, wherein the private bitmap tracks which data blocks are present in the private sparse file.

3. The system of claim 1 wherein the first computing device is further configured to:

generate a master bitmap associated with the master sparse file, wherein the master bitmap tracks which data blocks are present in the master sparse file, including data blocks copied therein from the first snapshot, and generate a private bitmap associated with the private sparse file, wherein the private bitmap tracks which data blocks are present in the private sparse file, including data blocks copied therein from the master sparse file and data blocks written therein by the second computing device.

4. The system of claim 1 wherein the first computing device is further configured to store the first snapshot, the master sparse file, and the private sparse file.

5. The system of claim 1 wherein the first computing device is further configured to:

receive from the second computing device a first read request for a first data block in the LUN, check a private bitmap associated with the private sparse file to determine whether the first data block is present in the private sparse file, and if the private bitmap so indicates, serve the first data block from the private sparse file to the second computing device in response to the first read request, if the private bitmap indicates that the first data block is not present in the private sparse file, check a master bitmap associated with the master sparse file to determine whether the first data block is present in the master sparse file, and if the master bitmap so indicates, serve the first data block from the master sparse file to the second computing device in response to the first read request, and if the private bitmap indicates that the first data block is not present in the private sparse file and the master bitmap indicates that the first data block is not present in the master sparse file, copy the first data block from the first snapshot to the master sparse file and update the master bitmap to indicate that the first data block is present in the master sparse file.

6. The system of claim 1 wherein the first computing device is further configured to:

receive from the second computing device a first write request to write a first data block to the LUN, check a private bitmap associated with the private sparse file to determine whether the private sparse file comprises a corresponding data block, and if the private bitmap so indicates, write the first data block as received from the second computing device to the private sparse file, thereby overwriting the corresponding data block, and if the private bitmap indicates that the private sparse file lacks the corresponding data block, check a master bitmap associated with the master sparse file to determine whether the master sparse file comprises the corresponding data block, and if the private bitmap so indicates, copy the corresponding data block from the master sparse file to the private sparse file and update the private bitmap to indicate that the private sparse file comprises the corresponding data block.

7. The system of claim 1 wherein the private sparse file is based on the first snapshot and the master sparse file, and incorporates changes generated by the second computing device that are written to the private sparse file without changing the first snapshot, thereby becoming a private writable snapshot.

8. A computer-readable medium, excluding transitory propagating signals, storing instructions that, when executed by at least one computing device comprising one or more processors and computer memory, cause the computing device to perform operations comprising:

receiving from a second computing device via ISCSI protocol, a first unique identifier and a first request for a first private writable snapshot of a first volume;

if a first snapshot of the first volume was not previously created, generating a first snapshot of the first volume;

from the first snapshot, generating a sparse file designated a master sparse file which corresponds to the first snapshot;

from the master sparse file, generating a private sparse file having the first unique identifier received from the second computing device;

presenting by the first computing device the private sparse file as a logical unit number (LUN) to the second computing device, to be mounted thereby as the LUN, thereby granting the first computing access to the private sparse file as the first private writable snapshot.

9. The computer-readable medium of claim 8, wherein the operations further comprise:

receiving from the second computing device a first read request for a first data block in the LUN;

checking a private bitmap associated with the private sparse file to determine whether the first data block is present in the private sparse file, and if the private bitmap so indicates, serving the first data block from the private sparse file to the second computing device in response to the first read request;

if the private bitmap indicates that the first data block is not present in the private sparse file, checking a master bitmap associated with the master sparse file to determine whether the first data block is present in the master sparse file, and if the master bitmap so indicates, serving the first data block from the master sparse file to the second computing device in response to the first read request.

10. The computer-readable medium of claim 9, wherein the operations further comprise:

if the private bitmap indicates that the first data block is not present in the private sparse file and the master bitmap indicates that the first data block is not present in the master sparse file, copying the first data block from the first snapshot to the master sparse file and updating the master bitmap to indicate that the first data block is present in the master sparse file.

11. The computer-readable medium of claim 8, wherein the operations further comprise:

receiving from the second computing device a first write request to write a first data block to the LUN;

checking a private bitmap associated with the private sparse file to determine whether the private sparse file comprises a corresponding data block, and if the private bitmap so indicates, writing the first data block as received from the second computing device to the private sparse file, thereby overwriting the corresponding data block, and if the private bitmap indicates that the private sparse file lacks the corresponding data block, checking a master bitmap associated with the master sparse file to determine whether the master sparse file comprises the corresponding data block, and if the private bitmap so indicates, copying the corresponding data block from the master sparse file to the private sparse file and updating the private bitmap to indicate that the private sparse file comprises the corresponding data block.

12. A method for providing private writable snapshots to user computing devices, the method comprising:

receiving,
by a first computing device that executes an Internet Small Computer Systems Interface (ISCSI) service, from a second computing device in communication with the first computing device via ISCSI protocol, a first unique identifier and a first request for a first private writable snapshot of a first volume;

if a first snapshot of the first volume was not previously created, generating by the first computing device a first snapshot of the first volume;

from the first snapshot, generating by the first computing device a sparse file designated a master sparse file which corresponds to the first snapshot;

from the master sparse file, generating by the first computing device a private sparse file having the first unique identifier received from the second computing device;

presenting by the first computing device the private sparse file as a logical unit number (LUN) to the second computing device; and mounting the LUN by the second computing device, thereby acquiring access to the private sparse file for browsing data blocks obtained from the first volume and further for implementing changes to the data blocks obtained from the first volume without changing the first snapshot, and wherein the private sparse file is based on the first snapshot and the master sparse file, and incorporates changes generated by the second computing device that are written to the private sparse file, thereby becoming a private writable snapshot.

13. The method of claim 12 further comprising:

generating by the first computing device a master bitmap associated with the master sparse file, wherein the master bitmap tracks which data blocks are present in the master sparse file, and generating by the first computing device a private bitmap associated with the private sparse file, wherein the private bitmap tracks which data blocks are present in the private sparse file.

14. The method of claim 12 further comprising:

generating by the first computing device a master bitmap associated with the master sparse file, wherein the master bitmap tracks which data blocks are present in the master sparse file, including data blocks copied therein from the first snapshot, and generating by the first computing device a private bitmap associated with the private sparse file, wherein the private bitmap tracks which data blocks are present in the private sparse file, including data blocks copied therein from the master sparse file and data blocks written therein by the second computing device.

15. The method of claim 12 wherein the first computing device stores the first snapshot, the master sparse file, and the private sparse file.

16. The method of claim 12 further comprising:

receiving by the first computing device from the second computing device a first read request for a first data block in the LUN, checking by the first computing device a private bitmap associated with the private sparse file to determine whether the first data block is present in the private sparse file, and if the private bitmap so indicates, serving the first data block from the private sparse file to the second computing device in response to the first read request, and if the private bitmap indicates that the first data block is not present in the private sparse file, checking by the first computing device a master bitmap associated with the master sparse file to determine whether the first data block is present in the master sparse file, and if the master bitmap so indicates, serving the first data block from the master sparse file to the second computing device in response to the first read request.

17. The method of claim 16 further comprising:

if the private bitmap indicates that the first data block is not present in the private sparse file and the master bitmap indicates that the first data block is not present in the master sparse file, copying by the first computing device the first data block from the first snapshot to the master sparse file and update the master bitmap to indicate that the first data block is present in the master sparse file.

18. The method of claim 12 further comprising:

receiving by the first computing device from the second computing device a first write request to write a first data block to the LUN; and checking by the first computing device a private bitmap associated with the private sparse file to determine whether the private sparse file comprises a corresponding data block, and if the private bitmap so indicates, writing the first data block as received from the second computing device to the private sparse file, thereby overwriting the corresponding data block.

19. The method of claim 18 further comprising:
if the private bitmap indicates that the private sparse file lacks the corresponding data block, checking a master bitmap associated with the master sparse file to determine whether the master sparse file comprises the corresponding data block, and if the private bitmap so indicates, copying the corresponding data block from the master sparse file to the private sparse file and updating the private bitmap to indicate that the private sparse file comprises the corresponding data block.

* * * * *